United States Patent
Demiralp et al.

(10) Patent No.: US 10,212,061 B2
(45) Date of Patent: Feb. 19, 2019

(54) DYNAMICALLY RENDERING INTERACTION STATISTICS DATA FOR CONTENT ELEMENTS OF AN INFORMATION RESOURCE USING VISUAL STYLES

(71) Applicant: Google Inc., Mountain View, CA (US)

(72) Inventors: Emre Demiralp, San Francisco, CA (US); Tommaso Francesco Bersano-Begey, Mountain View, CA (US)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 15/137,864

(22) Filed: Apr. 25, 2016

(65) Prior Publication Data
US 2017/0310567 A1    Oct. 26, 2017

(51) Int. Cl.
*G06F 17/22* (2006.01)
*G06F 17/24* (2006.01)
(Continued)

(52) U.S. Cl.
CPC ............ *H04L 43/08* (2013.01); *G06F 3/0481* (2013.01); *G06F 17/2247* (2013.01);
(Continued)

(58) Field of Classification Search
CPC . G06F 17/30899; G06F 3/0481; H04L 43/08; H04L 43/062; G06T 11/206
See application file for complete search history.

(56) References Cited

U.S. PATENT DOCUMENTS 7,165,105 B2  1/2007 Reiner et al.
7,644,375 B1  1/2010 Anderson et al.
(Continued)

FOREIGN PATENT DOCUMENTS

EP     2 704 037 A2    3/2014

OTHER PUBLICATIONS

Anonymous: "Event Tracking in Google Analytics Explained for Non-Coders," Aug. 15, 2013, XP055384807, Retrieved from the Internet: URL:http://www.seerinterative.com/blog/event-tracking-explained/, retrieved on Jun. 23, 2017, pp. 1-4.
(Continued)

*Primary Examiner* — Jeffrey A Gaffin
*Assistant Examiner* — Bille M Dahir
(74) *Attorney, Agent, or Firm* — Foley & Lardner LLP

(57) ABSTRACT

Systems and methods of dynamically rendering webpage interaction statistics data are described herein. A computing device can receive, at a first time, the information resource. The information resource can include a content element, a first interaction metric for the content element, and a style specifier. The style specifier can a first and second visual style corresponding to a first and second range of interaction metrics respectively. The computing device can determine that the first interaction metric is within the first range and set the content element to the first style based on the determination. The computing device can receive, at a second time, a second interaction metric for the content element. The computing device can determine that the second interaction metric is within the second range and set the content element to the second style based on the determination.

20 Claims, 9 Drawing Sheets

(51) Int. Cl.
   *G06F 17/30* (2006.01)
   *G06T 11/00* (2006.01)
   *G06T 11/20* (2006.01)
   *H04L 12/26* (2006.01)
   *G06F 3/0481* (2013.01)

(52) U.S. Cl.
   CPC ........ *G06F 17/24* (2013.01); *G06F 17/30899* (2013.01); *G06T 11/001* (2013.01); *G06T 11/206* (2013.01); *H04L 43/062* (2013.01)

(56) References Cited

U.S. PATENT DOCUMENTS

| | | | |
|---|---|---|---|
| 8,296,666 B2 | 10/2012 | Wright et al. | |
| 8,606,912 B1* | 12/2013 | Moon | G06F 17/30861 |
| | | | 340/995.1 |
| 8,689,108 B1* | 4/2014 | Duffield | G06Q 30/02 |
| | | | 709/220 |
| 8,812,960 B1 | 8/2014 | Sun et al. | |
| 2007/0005481 A1* | 1/2007 | Kedia | G06Q 40/04 |
| | | | 705/37 |
| 2008/0046562 A1 | 2/2008 | Butler | |
| 2008/0181463 A1 | 7/2008 | Error | |
| 2008/0184129 A1 | 7/2008 | Cancel et al. | |
| 2009/0037579 A1 | 2/2009 | Error et al. | |
| 2012/0233090 A1 | 9/2012 | Tavares et al. | |
| 2013/0031470 A1* | 1/2013 | Daly, Jr. | G06F 17/30867 |
| | | | 715/243 |
| 2013/0166375 A1* | 6/2013 | YoungLincoln | G06Q 30/0246 |
| | | | 705/14.45 |
| 2014/0033007 A1 | 1/2014 | Mhatre | |
| 2014/0095257 A1 | 4/2014 | Lewis et al. | |
| 2014/0143652 A1 | 5/2014 | Deloach et al. | |
| 2014/0267290 A1 | 9/2014 | Hao et al. | |
| 2015/0205887 A1 | 7/2015 | Freund et al. | |
| 2016/0188552 A1* | 6/2016 | Wang | G06F 17/218 |
| | | | 715/236 |

OTHER PUBLICATIONS

Hochheiser et al., "Using Interactive Visualization of WWW Log Data to Characterize Access Patterns and Inform Site Design," 2001.
International Search Report and Written Opinion for Application No. PCT/US2017/028969 dated Jul. 20, 2017.
International Search Report and Written Opinion for Application No. PCT/US2017/028973, dated Jun. 19, 2017.
International Search Report and Written Opinion for Application No. PCT/US2017/028975, dated Jul. 4, 2017.
Magdalini Eirinaki et al., "Web Mining for Web Personalization," ACM Transactions on the Internet Technology, ACM, New York, NY, US, vol. 3, No. 1, Feb. 1, 2003, pp. 1-27.
U.S. Notice of Allowance on U.S. Appl. No. 15/137,898 dated Jun. 16, 2017.
U.S. Office Action on U.S. Appl. No. 15/137,884 dated Apr. 19, 2017.
U.S. Office Action on U.S. Appl. No. 15/137,884 dated Jun. 21, 2017.
U.S. Office Action on U.S. Appl. No. 15/137,898 dated Apr. 14, 2017.
U.S. Office Action on U.S. Appl. No. 15/716,113 dated May 23, 2018.
Magdalini Eirinaki et al: "Web mining for web personalization", ACM Transactions on Internet Technology, ACM, New York, NY, US, vol. 3, No. 1, Feb. 1, 2003 (Feb. 1, 3003), pp. 1-27, XP058245886, ISSN: 1533-5399, DOI: 10.1145/643477.643478.
Notification of Transmittal of the International Preliminary Report on Patentability, re PCT/2017/028975 dated Jul. 2, 2018.

\* cited by examiner

DYNAMICALLY RENDERING INTERACTION STATISTICS DATA FOR CONTENT ELEMENTS OF AN INFORMATION RESOURCE USING VISUAL STYLES

BACKGROUND

In a computer networked environment such as the Internet, entities such as people or companies provide information for public display on web pages or other online documents. The documents can include information provided by the entities via a computing device for display on the Internet. Content can also be provided by other entities for display on the documents together with the information provided by the entities. Thus, a user viewing a document can access the information that is the subject of the document, as well as third party content that may or may not be related to the subject matter of the document.

SUMMARY

At least one aspect is directed to a method of dynamically rendering webpage interaction statistics data over graphical user interfaces. A resource request module executing on a computing device having one or more processors can transmit, via a network interface of the computing device, a request for interaction statistics to an interaction log system. The request for interaction statistics can identify an information resource. The resource request module can receive, via the network interface, at a first time, from the interaction log system, the information resource. The information resource can include a content element corresponding to a content element identifier. The information resource can include a first interaction metric for the content element identifier. The first interaction metric can be based on interaction data accumulated by the interaction log system from a plurality of client devices for the content element of the information resource. The information resource can include a style specifier. The style specifier can specify a first visual style corresponding to a first range of interaction metrics and a second visual style corresponding to a second range of interaction metrics. An element mapper module executing on the computing device can identify, responsive to receiving the information resource, the content element for the first interaction metric based on the corresponding content element identifier. The element mapper module can determine that the first interaction metric is within the first range of interaction metrics. A resource modifier module executing on the computing device can set the content element to the first visual style based on determining that the first interaction metric is within the first range of interaction metrics. A rendering engine executing on the computing device can display the information resource including the content element set to the first visual style. The resource request module can receive, at second time subsequent to the first time, from the interaction log system, a second interaction metric for the content element identifier. The second interaction metric can be based on the interaction data accumulated by the interaction log system from the plurality of client devices for the content element of the information resource. The element mapper module can identify, responsive to receiving the second interaction metric, the content element for the second interaction metric based on the corresponding content element identifier. The element mapper module can determine that the second interaction metric is within the second range of interaction metrics. The resource modifier module can set the content element to the second visual style based on determining that the second interaction metric is within the second range of interaction metrics. The rendering engine can display the information resource including the content element set to the second visual style.

In some implementations, receiving the information resource at the first time can further include receiving the information resource including a plurality of first interaction statistics. Each of the first interaction metrics can correspond to a client device segment. Each client device segment can correspond to a subset of the plurality of client devices. In some implementations, receiving the information resource at the first time can further include receiving the information resource including an interface element including a plurality of actionable items corresponding to each of the plurality of client device segments. Each of the plurality of actionable items can be configured to set the content element to the first visual style or the second visual style based on the corresponding first interaction metric of the plurality of interaction metrics. Receiving the second interaction metric at the second time can further include receiving the plurality of second interaction metrics. Each of the plurality of second interaction metrics can correspond to the client device segment. In some implementations, the resource modifier module can insert the interface element into the information resource. The interface element can include a plurality of actionable items corresponding to each of the plurality of client device segments. In some implementations, setting the content element to the first visual style can further include setting the content element to the first visual style, responsive to detecting a first event on one of the plurality of actionable items on the interface element and determining that the corresponding first interaction metric of the plurality of first interaction metrics is within the first range of interaction metrics. In some implementations, setting the content element to the second visual style can further include setting the content element to the second visual style, responsive to detecting a second event on one of the plurality of actionable items on the interface element and determining that the corresponding second interaction metric of the plurality of second interaction metrics is within the second range of interaction metrics In some implementations, receiving the information resource including the first interaction metric can further include receiving the information resource including the first interaction metric including a first type interaction metric and a second type interaction metric. Each of the first type interaction metric and the second type interaction metric can be based on the interaction data accumulated by the interaction log system from the plurality of client devices for the content element of the information resource. In some implementations, receiving the information resource including the first interaction metric can further include receiving the information resource including an interface element. The interface element can include a first actionable item and a second interaction item. The first actionable item can be configured to set the content element to the first visual style or the second visual style based on the first type interaction metric. The second actionable item can be configured to set the content element to the first visual style or the second visual style based on the second type interaction metric. In some implementations, the resource modifier module can monitor for an event on the first actionable item. In some implementations, determining that the first interaction metric is within the first range of interaction metrics can further include determining that the first type interaction metric is within the first range of interaction metrics, responsive to detecting the event on the first actionable item. In some implementations, setting the content element to the first visual style can further include setting the content element to the first visual style based on determining that the first type interaction metric is within the first range of interaction metrics.

In some implementations, receiving the information resource including the first interaction metric can further include receiving the information resource including the first content element. The first content element may be actionable. In some implementations, receiving the information resource including the first interaction metric can further include receiving the information resource including a second content element corresponding to a second content element identifier. The second content element can have a default visual style and may be non-actionable. In some implementations, receiving the information resource including the first interaction metric can further include receiving the information resource including a third interaction metric for the second content element identifier. The third interaction metric may be based on the interaction data accumulated by the interaction log system from a plurality of client devices for the second content element of the information resource. In some implementations, receiving the information resource including the first interaction metric can further include receiving the information resource include the style specifier. The style specifier can specify the first visual style for the second content element corresponding to the first range of interaction metrics and the second visual style for the second content element corresponding to the second range of interaction metrics. In some implementations, the element mapper module can identify that the content element is actionable and that the second content element is non-actionable. In some implementations, setting the content element to the first visual style can further include setting the content element to the first visual style, responsive to identifying that the content element is actionable. In some implementations, the resource modifier module can maintain the second content element to the default visual style, responsive to identifying that the second content element is non-actionable.

In some implementations, receiving the information resource including the first interaction metric further comprises receiving an interface element. The interface element can include an actionable item. The actionable item can be configured to set the content element to the one of first visual style and the second visual style or a default visual style of the content element. In some implementations, the resource modifier module can monitor for an event on the actionable item of the interface element. In some implementations, the element mapper module can determine that the content element is set to the first visual style or the second visual style, responsive to detecting the event on the interface element. In some implementations, the resource modifier module can set the content element to the default visual style of the content element, responsive to determining that the content element is set to the first visual style or the second visual style.

In some implementations, the element mapper module can compare the second interaction metric to the first interaction metric, responsive to receiving the second interaction metric. In some implementations, setting the content element to the second visual style can further include inserting an interaction metric difference indicator on the content element based on determining that the second interaction metric differs from the first interaction metric by at least a predefined margin.

In some implementations, the resource modifier module can monitor for an event on the content element. In some implementations, the resource modifier module, responsive to detecting the event on the content element, a text element onto the information resource. The text element can include the first interaction metric or the second interaction metric.

In some implementations, receiving the second interaction metric can further include. the second interaction metric from the interaction log system, responsive to the interaction log system determining that the interaction data has changed by at least a predefined metric threshold between the second time and the first time. In some implementations, receiving the second interaction metric can further include receiving the second interaction metric from the interaction log system, responsive to the interaction log system determining that a predefined time threshold has lapsed between the first time and the second time.

In some implementations, setting the content element to the first visual style can further include setting a color property of the content element to a first color tuple value different from a default color tuple value of the content element. In some implementations, setting the content element to the second visual style can further include setting the color property of the content element to a second color tuple value different from the first color tuple value and the default color tuple value of the content element.

At least one aspect is directed to a system for dynamically rendering webpage interaction statistics data over graphical user interfaces. A resource request module executing on a computing device having one or more processors can transmit, via a network interface of the computing device, a request for interaction statistics to an interaction log system. The request for interaction statistics can identify an information resource. The resource request module can receive, via the network interface, at a first time, from the interaction log system, the information resource. The information resource can include a content element corresponding to a content element identifier. The information resource can include a first interaction metric for the content element identifier. The first interaction metric can based on interaction data accumulated by the interaction log system from a plurality of client devices for the content element of the information resource. The information resource can include a style specifier. The style specifier can specify a first visual style corresponding to a first range of interaction metrics and a second visual style corresponding to a second range of interaction metrics. An element mapper module executing on the computing device can identify, responsive to receiving the information resource, the content element for the first interaction metric based on the corresponding content element identifier. The element mapper module can determine that the first interaction metric is within the first range of interaction metrics. A resource modifier module executing on the computing device can set the content element to the first visual style based on determining that the first interaction metric is within the first range of interaction metrics. A rendering engine executing on the computing device can display the information resource including the content element set to the first visual style. The resource request module can receive, at second time subsequent to the first time, from the interaction log system, a second interaction metric for the content element identifier. The second interaction metric can based on the interaction data accumulated by the interaction log system from the plurality of client devices for the content element of the information resource. The element mapper module can identify, responsive to receiving the second interaction metric, the content element for the second interaction metric based on the corresponding content element identifier. The element mapper module can determine that the second interaction metric is within the second range of interaction metrics. The resource modifier module can set the content element to the second visual style based on determining that the second interaction metric is within the second range of interaction metrics. The rendering engine can display the information resource including the content element set to the second visual style.

In some implementations, the resource request module can receive at the first time the information resource. The information resource can include the first interaction metric. The first interaction metric can include a plurality of first interaction metrics. Each of the first interaction metrics can correspond to a client device segment. Each client device segment can correspond to a subset of the plurality of client devices. The information resource can include an interface element. The interface element can include a plurality of actionable items corresponding to each of the plurality of client device segments. Each of the plurality of actionable items can be configured to set the content element to the first visual style or the second visual style based on the corresponding first interaction metric of the plurality of interaction metrics. In some implementations, the resource request module can receive at the second time the information resource. The information resource can include the second interaction metric. The second interaction metric can include a plurality of second interaction metrics. Each of the plurality of second interaction metrics can correspond to the client device segment. In some implementations, the resource modifier module can insert the interface element including the plurality of actionable items corresponding to each of the plurality of client device segments. In some implementations, the resource modifier module can set the content element to the first visual style, responsive to detecting a first event on one of the plurality of actionable items on the interface element and determining that the corresponding first interaction metric of the plurality of first interaction metrics is within the first range of interaction metrics. In some implementations, the resource modifier module can set the content element to the second visual style, responsive to detecting a second event on one of the plurality of actionable items on the interface element and determining that the corresponding second interaction metric of the plurality of second interaction metrics is within the second range of interaction metrics.

In some implementations, the resource request module can receive the information resource. The information resource can include the first interaction metric. The first interaction metric can include a first type interaction metric and a second type interaction metric. Each of the first type interaction metric and the second type interaction metric can be based on the interaction data accumulated by the interaction log system from the plurality of client devices for the content element of the information resource. The information resource can include an interface element. The interface element can include a first actionable item and a second interaction item. The first actionable item can be configured to set the content element to the first visual style or the second visual style based on the first type interaction metric. The second actionable item can be configured to set the content element to the first visual style or the second visual style based on the second type interaction metric. In some implementations, the resource modifier module can monitor for an event on the first actionable item. In some implementations, the element mapper module can determine that the first type interaction metric is within the first range of interaction metrics, responsive to detecting the event on the first actionable item. In some implementations, the resource modifier module can set the content element to the first visual style based on determining that the first type interaction metric is within the first range of interaction metrics.

In some implementations, the resource request module can receive the information resource. The information resource can include the first content element. The first content element can be actionable. The information resource can include a second content element corresponding to a second content element identifier. The second content element can have a default visual style and can be non-actionable. The information resource can include a third interaction metric for the second content element identifier. The third interaction metric can be based on the interaction data accumulated by the interaction log system from a plurality of client devices for the second content element of the information resource. The information resource can include the style specifier. The style specifier can specify the first visual style for the second content element corresponding to the first range of interaction metrics and the second visual style for the second content element corresponding to the second range of interaction metrics. In some implementations, the element mapper module can identify that the content element is actionable and that the second content element is non-actionable. In some implementations, the resource modifier module can set the content element to the first visual style, responsive to identifying that the content element is actionable. In some implementations, the resource modifier module can maintain the second content element to the default visual style, responsive to identifying that the second content element is non-actionable.

In some implementations, the resource request module can receive the information resource. The information resource can include an interface element. The interface element can include an actionable item. The actionable item can be configured to set the content element to the one of first visual style and the second visual style or a default visual style of the content element. In some implementations, the resource modifier module can monitor for an event on the actionable item of the interface element. In some implementations, the element mapper module can determine that the content element is set to be the first visual style or the second visual style, responsive to detecting the event on the interface element. In some implementations, the resource modifier module can set the content element to the default visual style of the content element, responsive to determining that the content element is set to the first visual style or the second visual style.

In some implementations, the element mapper module can compare the second interaction metric to the first interaction metric, responsive to receiving the second interaction metric. In some implementations, the resource modifier module can insert an interaction metric difference indicator on the content element based on determining that the second interaction metric differs from the first interaction metric by at least a predefined margin.

In some implementations, the resource modifier module can monitor for an event on the content element. In some implementations, the resource modifier module can insert responsive to detecting the event on the content element, a text element onto the information resource. The text element can include the first interaction metric or the second interaction metric.

In some implementations, the resource request module can receive the second interaction metric from the interaction log system, responsive to the interaction log system determining that the interaction data has changed by at least a predefined metric threshold between the second time and the first time. In some implementations, the resource request module can receive the second interaction metric from the interaction log system, responsive to the interaction log system determining that a predefined time threshold has lapsed between the first time and the second time.

In some implementations, the resource modifier module can set a color property of the content element to a first color tuple value different from a default color tuple value of the content element. In some implementations, the resource modifier module can set the color property of the content element to a second color tuple value different from the first color tuple value and the default color tuple value of the content element.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
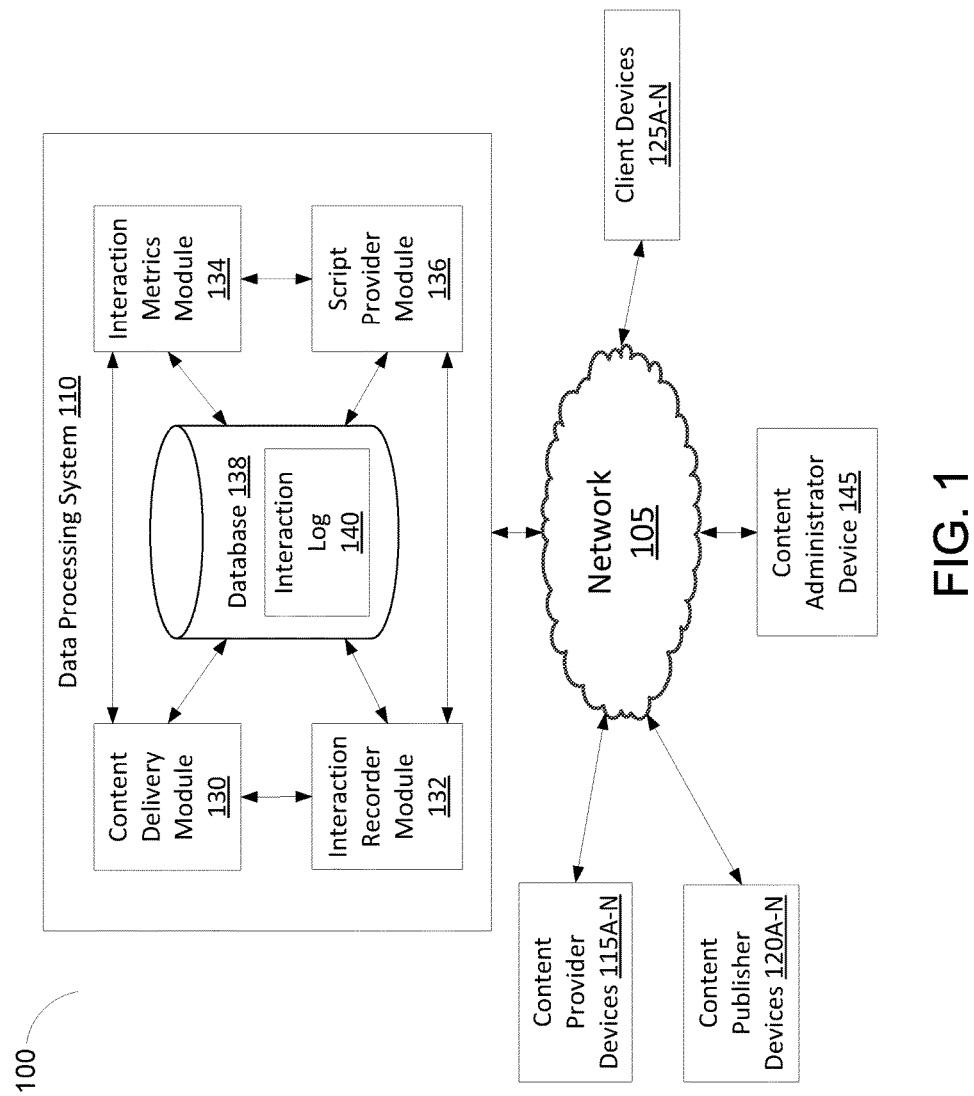
FIG. 1 is a block diagram depicting an environment for dynamically rendering webpage interaction statistics data over graphical user interfaces in a computer network environment, according to an illustrative implementation.

Following below are more detailed descriptions of various concepts related to, and implementations of, methods, apparatuses, and systems of dynamically rendering webpage interaction statistics data over graphical user interfaces in a computer network environment. The various concepts introduced above and discussed in greater detail below may be implemented in any of numerous ways, as the described concepts are not limited to any particular manner of implementation.

In a computer networked environment, servers may log a myriad of interactions within an information resource (e.g., webpage) by visiting client devices, as an event handler for the respective content element on the information resource is triggered. The recorded interactions may be used to measure the performance statistics of the information resource itself and the various content elements therein. One issue in making use of these performance statistics, however, is in processing and presenting them within a single viewable frame of a graphical interface together with the information resource as opposed to multiple frames and different interfaces to allow a user of the graphical interface to easily digest such statistics.

To address these and other challenges, the present disclosure is generally directed to systems and methods of dynamically rendering webpage interaction statistic data over a graphical user interface. In brief overview, the server can log the interactions on various content elements on an information resource, calculate performance statistics for each content element, and provide a script to a computing device to modify visual properties of each content element based on the respective calculated performance statistics.

In one implementation, the server can calculate various performance statistics for each content element of the information resource using on the logged interactions therefrom. The interactions may have been logged by the server from previous presentations of the information resource on various client devices, as each client device transmits a ping generated from the triggering of an event handler for the respective content element. The calculated performance statistics can include, for example, a number of clicks, a click-through rate, a number of hover-overs, a number of view or impressions, et cetera. As the server records more and more interactions by the multitude of client devices with the content elements of the information resource, the server can also periodically calculate the performance statistics. The server can insert into the information resource a script configured to modify the visual properties of each content element based on the corresponding calculated performance statistic. The visual properties can differ based on which range the calculated performance statistic is within. The server can then transmit the information resource with the script to a client device, upon receiving a request from a computing device.

Once the information resource is received, the computing device executing the script can identify the content elements on the information resource. For each content element, the client device can determine which performance metric range the corresponding performance statistic falls within. Having determined the range, the computing device can set the visual properties of each content element to the respective visual style. For example, if the script specifies that content elements with hover-over rates over 80% are to a darker hue, the client device can set the color property of the content element to the darker hue. The computing device can also periodically receive performance statistics updated by the server, and dynamically modify the visual properties of the respective content element on the information resource. These and other implementations may allow the computing device to graphically display the performance statistics of each content element on the information resource itself without interfering the other pre-specified behavior of the content elements or the information resource. As such, these and other implementations may improve human-computer interactions by decreasing the amount of time and number of interactions that a user would need to take to view such performance metrics, in turn lowering the consumption of computer resources, such as processing, power, and bandwidth, over time.

FIG. 1 is a block diagram depicting one implementation of an environment for dynamically rendering webpage interaction statistics data over graphical user interfaces on communication devices in a computer network environment. The environment 100 includes at least one data processing system 110. Although only one data processing system 110 is illustrated, in many implementations, data processing system 110 may be a farm, cloud, cluster, or other grouping of multiple data processing systems or computing devices. The data processing system 110 can include at least one processor and a memory, sometimes referred to as a processing circuit, each of which are discussed in more detail below in connection with FIG. 5. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system 110 can include one or more computing devices or servers that can perform various functions. In some implementations, the data processing system 110 can include an advertising auction system configured to host auctions. In some implementations, the data processing system 110 does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider device 115A-N, at least one content publisher device 120A-N, or at least one client device 125A-N. The network 105 may be any form of computer network that relays information between the content provider device 115A-N, data processing system 110, content administrator device 145 and one or more content sources, for example, web servers, advertising servers, among others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider devices 115A-N can include servers or other computing devices operated by a content provider entity to provide content elements for display on information resources at the client device 125A-N. The content provided by the content provider device 115A-N can include third party content elements or creatives (e.g., ads) for display on information resources, such as a website or web page that includes primary content, e.g. content provided by the content publisher devices 120A-N. The content elements can also be displayed on a search results web page. For instance, the content provider computing device 115 can provide or be the source of ads or other content elements for display in content slots of content web pages, such as a web page of a company where the primary content of the web page is provided by the company, or for display on a search results landing page provided by a search engine. The content elements associated with the content provider device 115A-N can be displayed on information resources other than web pages, such as content displayed as part of the execution of an application on a smartphone or other client device 125A-N.

The content publisher devices 120A-N can include servers or other computing devices operated by a content publishing entity to provide primary content for display via the network 105. For instance, the content publisher devices 120A-N can include a web page operator who provides primary content for display on the web page. The primary content can include content other than that provided by the content publisher devices 120A-N, and the web page can include content slots configured for the display of content elements from the content provider devices 115A-N. For instance, the content publisher devices 120A-N can operate the website of a company and can provide content about that company for display on web pages of the website. The web pages can include content slots configured for the display of third party content elements of the content provider computing device 115. In some implementations, the content publisher devices 120A-N includes a search engine computing device (e.g. server) of a search engine operator that operates a search engine website. The primary content of search engine web pages (e.g., a results or landing web page) can include results of a search as well as third party content elements displayed in content slots such as content elements from the content provider device 115A-N.

The client devices 125A-N and the content administrator device 145 can include computing devices configured to communicate via the network 105 to display data such as the content provided by the content publisher devices 120A-N (e.g., primary web page content or other information resources) and the content provided by the content provider computing device 115 (e.g., third party content elements configured for display in a content slot of a web page). The client device 125, the content provider devices 115A-N, the content publisher devices 120A-N, and the content administrator device 145 can include desktop computers, laptop computers, tablet computers, wearable computers, smartphones, personal digital assistants, mobile devices, consumer computing devices, servers, clients, digital video recorders, a set-top box for a television, a video game console, or any other computing device configured to communicate via the network 105. The client devices 125A-N and the content administrator device 145 can be communication devices through which an end user can submit requests to receive content. The requests can be requests to a search engine and the requests can include search queries. In some implementations, the requests can include a request to access a web page. In some implementations, the content administrator device 145 can include computing devices configured to communicate via the network 105 to retrieve and display interaction statistics data with information resources and content elements of the information resources from the data processing system 110, content provider devices 115A-N, content publisher devices 120A-N.

The content provider devices 115A-N, the content publisher devices 120A-N, the client devices 125A-N, and the content administrator device 145 can include a processor and a memory or a processing circuit as discussed above and as discussed in more detail in connection with FIG. 5. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider devices 115A-N, the content publisher devices 120, the client devices 125A-N, and the content administrator device 145 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider devices 115A-N, the content publisher devices 120A-N, the client devices 125A-N, and the content administrator device 145 (e.g., a built-in display, microphone, etc.) or external to the housing of content provider devices 115A-N, the content publisher devices 120A-N and the client devices 125A-N (e.g., a monitor connected to the client device 125A-N, a speaker connected to the client device 125A-N, etc.), according to various implementations.

For example, the content provider devices 115A-N, the content publisher devices 120A-N, the client devices 125A-N, and the content administrator device 145 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider devices 115A-N. In some implementations, the advertiser can communicate with the data processing system 110 via a user interface displayed on the user interface devices of the content provider devices 115A-N.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content delivery module 130, at least one interaction recorder module 132, at least one script provider module 136, and at least one interaction metrics module 134. The conversion tracker module 130 can include at least one processing unit, server, virtual server, circuit, engine, agent, appliance, or other logic device such as programmable logic arrays configured to communicate with the database 138 and with other computing devices (e.g., the content provider computing device 115, the content publisher devices 120A-N, the client device 125, or the content administrator device 145) via the network 105. The data processing system 110 can also include one or more content repositories or databases 138. The databases 138 can be local to the data processing system 110. In some implementations, the databases 138 can be remote to the data processing system 110 but can communicate with the data processing system 110 via the network 105.

The content delivery module 130, the interaction recorder module 132, the script provider module 136, and the interaction metrics module 134 can include or execute at least one computer program or at least one script. The content delivery module 130, the interaction recorder module 132, the script provider module 136, and the interaction metrics module 134 can be separate components, a single component, or part of the data processing system 110. The content delivery module 130, the interaction recorder module 132, the script provider module 136, and the interaction metrics module 134 can include combinations of software and hardware, such as one or more processors configured to execute one or more scripts.

The data processing system 110 can also include one or more content repositories or databases 138. The databases 138 can be local to the data processing system 110. In some implementations, the databases 138 can be remote to the data processing system 110 but can communicate with the data processing system 110 via the network 105. The databases 138 can include information resource, content elements, and interaction statistics visualization script, among others, to serve to any of the content provider devices 115A-N, content publisher devices 120A-N, client devices 125A-N, or the content administrator device 145. In some implementations, the databases 138 can include the interaction log 140. The interaction log 140 can include an information resource identifier and a content element identifier. The information resource identifier can include, for example, a resource address (e.g., Uniform Resource Locator (URL)), an alphanumerical identifier, or an array index. The content element identifier can include, for example, a resource address (e.g., URL), an alphanumerical identifier, or an array index. The interaction log 140 can include a log listing each interaction with the content elements of the information resource. Each entry of the interaction log 140, for example, can include an interaction type and a timestamp arranged by content element identifier and information resource identifier. In some implementations, the interaction log 140 may be maintained by the interaction recorder module 132 or the interaction metrics module 134. In some implementations, information resources and content elements of the information resources can include those illustratively depicted in FIGS. 3A-3D. Additional details of the contents of the database 138 will be provided below.

The content delivery module 130 can receive a request for content from one of the client devices 125A-N. The request for content can include a request for an information resource or a request for content element for the information resource. The information resource may be, for example, a webpage. The content element may be, for example, a document object model (DOM) object of the webpage, such as a textbox, inline frame, video, image, and body text, among others. The request for content can include an identifier for the information resource or the content element. For example, the request for content can include Uniform Resource Locator (URL) referring to a specific resource such as a webpage (e.g., "https://www.example.com/homepage.html"). The host name of the URL for the information resource may differ from the host name of the URL for the content element. For example, the URL for the information resource can be "https://www.example_10.com/index.html" but the URL for the content element can be "https://www.example_23.com/content_obj_271828.html."

The content delivery module 130 can transmit the information resource or the content element of the information resource to the client device 125A-N. The content delivery module 130 can identify the address or identifier for the information resource and the content element included in the request for content. The content delivery module 130 can retrieve, select, or otherwise access the information resource or the content element identified by the address or identifier. Upon retrieving the information resource or the content element identifier in the request from the client device 125A-N content delivery module 130 can transmit the information resource or the content element identified by the address or identifier to the client device 125A-N.

In some implementations, the content delivery module 130 can receive the content element from an ad auction system that can select the content element for display based on an ad auction. The ad auction system can select an ad from a plurality of ads based on ad auction parameters, such as bid values, size of ad, click-through rate (CTR), cost per mille (CPM), and impression rate, among others. The ad auction system can select the ad from the plurality of ads further based on size specifications of the respective ad and ad performance from previous presentation of the respective ad.

The interaction recorder module 132 can accumulate interactions by the client devices 125A-N on the information resource or the content elements of the information resource. In some implementations, the interaction recorder module 132 can receive a ping or interaction indicator indicating interaction on the information resource or the content element of the information resource. The information resource or the content element transmitted to the client device 125A-N can include a pingback script. Once loaded onto the client device 125A-N, the pingback script can transmit a ping or an interaction identifier indicating interaction by the client device 125A-N on the respective content element. The ping or the interaction indicator can include an information resource identifier, a content element identifier, an interaction type, a client device identifier, timestamp, and other metadata. The content element identifier can correspond to the content element upon which the client device 125A-N detected an event on. The interaction type can identify which event was detected by the client device 125A-N from an input-output device such as a mouse, keyboard, and touchscreen among others. The detected event may include, for example, click, touch, hover over, hover out, key press, mouse wheel, and scrolling, among others. The client device can correspond a unique alphanumerical identifier or a device address (e.g., IP or MAC address) corresponding to the client device 125A-N. The timestamp can include the time at which the event was detected by the client device 125A-N. Examples of metadata included in the ping or the interaction indicator may include a location identifier, device type identifier, application identifier, and account identifier, among others.

Upon receiving the ping or interaction indicator, the interaction recorder module 132 can save, update, or otherwise write onto the interaction log 140 of the database 138. In some implementations, the interaction recorder module 132 can create or generate an entry including the information resource identifier, the content element identifier, the interaction type, the client device identifier, and the timestamp from the ping or the interaction indicator. In some implementations, the interaction recorder module 132 can process the fields of the ping or the interaction indicator prior to recording the fields onto the interaction log 140 of the database. In some implementations, the interaction recorder module 132 can generate an entry using a subset of the fields in the ping or the interaction indicator. For example, the interaction recorder module 132 can record the information resource identifier, the content element identifier, and timestamp, while not saving the client device identifier and the interaction type. In some implementations, the interaction recorder module 132 can identify a range of times corresponding to the time stamp and then record the corresponding range of time for the entry in the interaction log 140.

In some implementations, the interaction recorder module 132 can maintain the interaction log 140 by one or more client device segments. In some implementations, the interaction recorder module 132 can save, update, or otherwise write the ping or the indication indicator onto the interaction log 140 of the database 138 arranged by the one or more client device segments. The one or more client device segments may be based on the location identifier, device type identifier, and the account identifier included in the metadata of the ping or the interaction indicator. In some implementations, the interaction recorder module 132 can save, update, or otherwise write the ping or the indicator into separate data structures in the interaction log 140 of the database 138. For example, if the interaction recorder module 132 receives one ping with the device type identifier "mobile phone" and another ping with the device type identifier "laptop," the interaction recorder module 132 can append one entry for the ping with the device type identifier "mobile phone" onto a data structure for mobile phones on the interaction log 140 and append another entry for the ping with the device type identifier "laptop" onto a separate, corresponding data structure for laptops on the interaction log 140 of the database 138.

The interaction metrics module 134 can calculate one or more interaction metrics for each of the content elements of the information resource based on the entries in the interaction log 140 of the database 138. The one or more interaction metrics can include click-through rate (CTR), hover-over rate, scroll-over rate, impression rate, and key press rate, among others. In some implementations, the interaction metrics module 134 can receive a request for interaction statistics from any of the content provider devices 115A-N, the content publisher devices 120A-N, the client devices 125A-N, and the content administrator device 145. The interaction metrics module 134 can calculate the one or more interactions, responsive to receiving the request for interaction statistics. The request for interaction statistics can include an information resource identifier or content element identifier. In some implementations, the request for interaction statistics can further include a specified time threshold. In some implementations, the interaction metrics module 134 can identify the respective entries in the interaction log 140 of the database 138 based on the information resource identifier or the content element identifier and the specified time threshold of the request for the interaction statistics. In some implementations, the interaction metrics module 134 can calculate the one or more interaction statistics for each of the content elements of an information resource identified from the information resource identifier in the request for interaction statistics. In some implementations, the interaction metrics module 134 can calculate the one or more interaction statistics for the content element identified from the content element identifier of the request for interaction statistics. For example, the interaction metrics module 134 can receive a request for hover-over rates for a specific textbox on the webpage identifier by the URL "www.example_55.com/page123.html" over the 12 hours prior to the request. In this example, the interaction metrics module 134 can calculate the hover-over rate by searching the interaction log 140 over a specified time threshold (e.g., 12 hours) for entries that include the interaction type indicating that the interaction was a hover-over and then divide the number of entries found over the specified time threshold. In some implementations, the interaction metrics module 134 can save, write, or otherwise store the calculated one or more interaction metrics onto the database 138 (e.g., the interaction log 140).

The interaction metrics module 134 can maintain a timer to determine whether time elapsed since receiving the request for interaction statistics is greater than or equal to a predefined time threshold. The timer can include an application, service, server, daemon, routine, or other executable logic for maintaining time. In some implementations, the interaction metrics module 134 can determine whether the time elapsed since transmitting the one or more interaction statistics is greater than or equal to the predefined time threshold. The interaction metrics module 134 can transmit the one or more interaction statistics to the content provider devices 115A-N, the content publisher devices 120A-N, the client devices 125A-N, and the content administrator device 145 associated with the request for interaction statistics, responsive to determining that the time elapsed is greater than or equal to the predefined time threshold. In some implementations, the interaction metrics module 134 can determine whether the time elapsed since transmitting the one or more interaction statistics is greater than or equal to the predefined time threshold.

The interaction metrics module 134 can maintain a comparator to determine whether the one or more interaction statistics have changed by at least a predefined metric threshold. The comparator can include an application, service, server, daemon, routine, or other executable logic for comparing the one or more interaction statistics. In some implementations, the interaction metrics module 134 can determine whether the one or more interaction statistics have changed by at least a predefined metric threshold, responsive to determining that the time elapsed since the request for interaction statistics or since transmitting the one or more interaction statistics is less than the predefined time threshold. In some implementations, the interaction metrics module 134 can retrieve the entries of the interaction log 140 of the database 138 for the information resource or the content element identified in the request for interaction statistics. In some implementations, the interaction metrics module 134 can determine whether the one or more interaction statistics have changed by at least a predefined metric threshold per client device segment.

In some implementations, the interaction metrics module 134 can compare a length of the currently retrieved entries to a length of the previously retrieved entries. If the length of the currently retrieved entries is greater than the length of the previously retrieved entries by at least a predefined metric threshold length, the interaction metrics module 134 can recalculate the one or more interaction statistics based on the currently retrieved entries. In some implementations, the interaction metrics module 134 can transmit the recalculated one or more interaction statistics to the content provider devices 115A-N, the content publisher devices 120A-N, the client devices 125A-N, and the content administrator device 145 associated with the request for interaction statistics. For example, the number of entries in the interaction log 140 for a specific inline frame on the information resource may be 12,503 when the original request for the interaction statistics was received but may then be 15,012 at some time later, and the predefined metric threshold length may be 2,500. In this example, the interaction metrics module 134 can calculate the difference in the lengths of the entries in the interaction log 140 for the inline frame and determine that the difference is greater than the predefined metric threshold length. Continuing the example, the interaction metrics module 134 can then recalculate the interaction statistics for the inline frame and transmit the recalculated interaction statistics to the computing device that made the original request for interaction statistics. In some implementations, the interaction metrics module 134 can compare the length of the currently retrieved entries to the length of the previously retrieved entries per client device segment.

In some implementations, the interaction metrics module 134 can calculate the one or more interaction statistics from the currently retrieved entries of the interaction log 140. In some implementations, the interaction metrics module 134 can compare the one or more interaction statistics calculated from the currently retrieved entries of the interaction log 140 to the one or more interaction statistics calculated from the previously retrieved entries of the interaction log 140 by at least a predefined metric threshold. In some implementations, the predefined metric threshold may differ from interaction type. For example, the predefined metric threshold may be 0.01 for click rates but 0.2 for hover over rates. In some implementations, if any of the one or more interaction statistics calculated from the currently retrieved entries of the interaction log 140 is different from the corresponding one or more interaction statistics calculated from the previously retrieved entries of the interaction log 140 by the predefined metric threshold, the interaction metric module 130 can transmit the one or more interaction statistics calculated from the currently retrieved entries to the content provider devices 115A-N, the content publisher devices 120A-N, the client devices 125A-N, and the content administrator device 145 associated with the request for interaction statistics. For example, if the key press rate for a specified text box on an information resource has changed by 0.34 and the predefined metric thresholds for key press rates for text boxes is 0.2, the interaction metrics module 134 can transmit the key press rate to the original computing device that sent the request for interaction statistics for the text box. In some implementations, the interaction metrics module 134 can calculate the one or more interaction statistics from the currently retrieved entries of the interaction log 140 per client device segment.

In some implementations, the interaction metrics module 134 can determine the number of the one or more interaction statistics calculated from the currently retrieved entries different from the one or more interaction statistics calculated from the previously retrieved entries by the predefined metric threshold. If the number of the one or more interaction statistics calculated from the currently retrieved entries different from the one or more interaction statistics calculated from the previously retrieved entries by the predefined metric threshold, the interaction metrics module 134 can transmit the one or more interaction statistics calculated from the currently retrieved entries to the content provider devices 115A-N, the content publisher devices 120A-N, the client devices 125A-N, and the content administrator device 145 associated with the request for interaction statistics. In some implementations, the interaction metrics module 134 can determine the number of the one or more interaction statistics calculated from the currently retrieved entries different from the one or more interaction statistics calculated from the previously retrieved entries from the interaction log 140 by the predefined metric threshold per client device segment.

The script provider module 136 can receive the request for interaction statistics from any of the content provider devices 115A-N, the content publisher devices 120A-N, the client devices 125A-N, and the content administrator device 145. The request for interaction statistics can include an information resource identifier or content element identifier. The script provider module 136 can retrieve the information resource and the content element identified in the request from any of the content provider devices 115A-N and the content publisher devices 120A-N, responsive to receiving the request. For example, if the request included the URL "www.example_431.com/index.html" corresponding to an inline frame content element on an information resource, the script provider module 136 can retrieve the content element from the any of the content provider devices 115A-N or the content publisher devices 120A-N corresponding to the URL.

The script provider module 136 can retrieve, access, or receive the one or more interaction metrics calculated by the interaction metrics module 134 corresponding to the information resource identifier or the content element identifier. In some implementations, the script provider module 136 can transmit a request to the interaction metrics module 134 or the database 138 for the one or more interaction metrics corresponding to the information resource identifier or the content element identifier. In some implementations, the script provider module 136 can subsequently receive the one or more interaction metrics from the interaction metrics module 134 or the database 138. The script provider module 136 can insert, embed, append, or otherwise add an interaction statistics visualization script into the information resource or the content element.

The interaction statistics visualization script can include one or more modules and the one or more interaction metrics calculated by the interaction metrics module 134. The interaction statistics visualization script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript™, among others. The computer-executable instructions can be executed by an application of any of the content provider devices 115A-N, the content publisher devices 120A-N, the client devices 125A-N, and the content administrator device 145. The application may have caused the content administrator device 145 to transmit the request for interaction statistics received by the script provider module 136. The application can include, for example, an Internet browser, mobile application, or any other computer program capable of reading and executing the computer-executable instructions. In brief overview, the computer-executable instructions of the interaction statistics visualization script, when executed by one or more processors of any of the content provider devices 115A-N, the content publisher devices 120A-N, the client devices 125A-N, can cause an application running on one or more processors to set visual properties of the information resource or the content element based on the calculated one or more interaction statistics for the corresponding information resource or the content element. Additional details relating to the functions of the interaction statistics visualization script are provided herein with respect to FIGS. 2 and 3A-3D.

The script provider module 136 can transmit the information resource or the content element including the interaction statistics visualization script to the content provider devices 115A-N, the content publisher devices 120A-N, the client devices 125A-N, or the content administrator device 145 associated with the request for interaction statistics. In some implementations, the script provider module 136 can transmit the interaction statistics visualization script without the information resource or the content element to the content provider devices 115A-N, the content publisher devices 120A-N, the client devices 125A-N, or the content administrator device 145. For example, the content administrator device 145 that transmitted the request for interaction statistics may already have the information resource and transmitted the interaction statistics visualization script. In some implementations, the script provider module 136 can transmit the interaction statistics visualization script to one of the content provider devices 115A-N or the content publisher devices 120A-N associated with the request for interaction statistics. Receipt of the interaction statistics visualization script can cause the respective content provider device 115A-N or the content publisher device 120A-N to insert the interaction statistics visualization script into the information resource or the content element and transmit the information resource or the content element with the interaction statistics visualization script to any one of the client devices 125A-N or the content administrator device 145. In some implementations, the script provider module 136 can transmit the interaction statistics visualization script or the one or more interaction metrics, responsive to the interaction metrics module 134 determining that the time elapsed since receiving the request for interaction statistics is greater than or equal to the predefined time threshold or determining that the one or more interaction statistics has changed by the predefined metric threshold.

Figure 2:
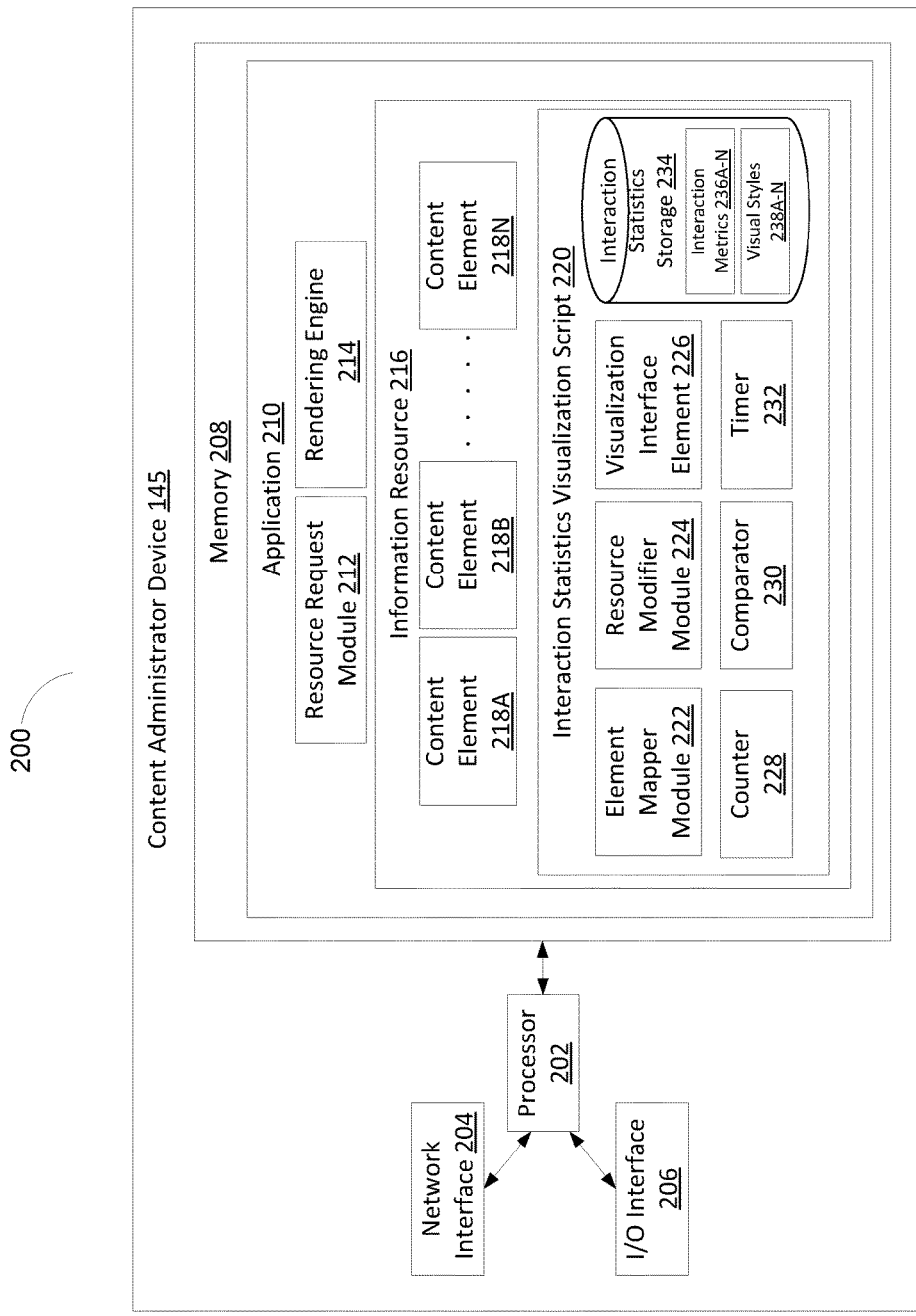
FIG. 2 is a block diagram depicting a system for dynamically rendering webpage interaction statistics data over graphical user interfaces in a computer network environment, according to an illustrative implementation.

Referring to FIG. 2, FIG. 2 is a block diagram depicting one implementation of a system 200 for dynamically rendering webpage interaction statistics data over graphical user interfaces in a computer network environment. The interaction statistics visualization system 200 can include a computing device (e.g., the client device 125A-N or the content administrator device 145 as depicted in FIG. 2) with one or more processors 202, a network interface 204, input-output interface 206, memory 208 for running an application 210. The one or more processors 202, the network interface 204, the input-output interface 206, and the memory 208 may be hardware components in the computing device those detailed below in conjunction with FIG. 5. The network interface 204 may be configured to interface with the network 105 described in FIG. 1. The input-output interface 206 may include a mouse, a keyboard, a touchscreen, and or microphone, among others. The application 210 can include, for example, an Internet browser, mobile application, or any other computer program capable of executing or otherwise invoking computer-executable instructions processed by the client device 125A-N or the content administrator device 145, such as the information resource 216, one or more content elements, a resource request module 212, a rendering engine 214, and the interaction statistics visualization script 220. The interaction statistics visualization script 220 can be received from the data processing system 110 or any interaction log system, and can include an element mapper module 222, a resource modifier module 224, a counter 228, a comparator 230, a timer 232, and an interaction statistics storage 234 with one or more interaction metrics 236A-N, and one or more visual styles 238A-N for a style specifier. The application 210 and the components, scripts, and modules therein may include any form of executable logic or instructions on memory or in a non-transitory computer-readable medium executed, run, or otherwise processed by the processor 202. The processor 202 in turn may interface with the network interface 202 and the input-output interface 206 in accordance with the executable logic or instructions of the application 210 and the components, scripts, and modules therein.

The resource request module 212 can transmit, via the network interface 204 of the content administrator device 145, a request for interaction statistics to the data processing system 110. The request for interaction statistics can identify an information resource 216 or a content element 218A-N on the information resource 216. In some implementations, the request for interaction statistics can include an information resource identifier or content element identifier. The information resource identifier can correspond to the information resource 216. The information resource identifier can include, for example, a resource address (e.g., Uniform Resource Locator (URL)) or any alphanumerical identifier. The content element identifier can correspond to any of the one or more content elements 218A-N. The content element identifier can include, for example, a resource address (e.g., URL) or any alphanumerical identifier. In some implementations, the request for interaction statistics can further include a specified time threshold for the interaction statistics. The specified time threshold may indicate a range of times for interaction metrics 236A-N. In some implementations, the resource request module 212 can transmit multiple requests for interaction statistics to the data processing system 110 at periodic times intervals.

The resource request module 212 can subsequently receive, via the network interface 204, from the data processing system 110, the information resource 216 or the content element 218A-N. The information resource 216 can include one or more content elements 218A-N and the interaction statistics visualization script 220, including the one or more interaction metrics 236A-N and the one or more visual styles 238A-N included in the style specifier. Each of the one or more content elements 218A-N can correspond to a node of a document object model (DOM) tree and a cascading style sheets (CSS) style generated by the application 210. In some implementations, the content element 218A-N can include the interaction statistics visualization script 220. Each of the one or more content elements 218A-N can correspond to a content element identifier. In some implementations, a subset of the one or more content elements 218A-N can be actionable, while another subset of the one or more content elements 218A-N may be non-actionable. For example, a body text content element on the information resource 216 may not have any instructions executed responsive to an event (e.g., click, key press, etc.) and may thus be considered non-actionable.

Each of the one or more interaction metrics 236A-N can correspond to a respective content element of the one or more content elements 218A-N. In some implementations, each of the one or more interaction metrics 236A-N can include one or more types of interaction metrics accumulated by the data processing system for the respective content element 218A-N. For example, one interaction metric 234A for a content element 218A may be a hover rate, while another interaction metric 234A' for the content element 218A may be a click rate. In some implementations, the interaction metrics 236A-N may be stored on a data structure (e.g., array, list, linked list, tree, matrix, table, etc.) listing each of the interaction metrics 236A-N and the corresponding content element identifier. In some implementations, subsets of the one or more interaction metrics 236A-N can correspond to interaction metrics for a client device segment maintained by the database 138. The client device segment can correspond to a subset of the one or more client devices 125A-N. For example, interaction metrics 236A-C may correspond to interaction metrics for a subset of client devices associated with a particular geographic region. Each of the one or more visual styles 238A-N can be included in a style specifier data structure (e.g., array, list, linked list, tree, matrix, table, etc.). Each of the one or more visual styles 238A-N can be used to set the visual properties of the content elements 218A-N and can correspond to a range of interaction metrics 236A-N. For example, one of the visual styles 238A may correspond to a hover rate between 0.0-0.05 and another visual style 236B may correspond to a hover rate between 0.05-0.1.

The resource request module 212 can receive the information resource 216, the one or more content elements 218A-N, the interaction statistics visualization script 220, the one or more interaction metrics 236A-N, or the visual styles 238A-N of the visual specifier repeatedly. For example, the application 210 may have loaded and may still display the information resource 216 on the display of the content administrator device 145. Subsequently, the resource request module 212 can receive, from the data processing system 110, a second or updated version of the interaction statistics visualization script 220, the one or more interaction metrics 236A-N, or the one or more visual styles 238A-N. In some implementations, the resource request module 212 can, at a first time, receive the information resource 216 or the content element 218A-N. In some implementations, the resource request module 212 can, at a second time subsequent to the first time, receive the second version or updated version of the information resource 216, the content elements 218A-N, the interaction statistics visualization script 220, the interaction metrics 236A-N, or the visual styles 238A-N of the visual specifier. In some implementations, the resource request module 224 can access the timer 232 to retrieve time. The timer 232 can include an application, service, server, daemon, routine, or other executable logic for maintaining time. In some implementations, using the timer 232, the resource request module 212 can transmit a request for interaction statistics, responsive to determining that the time elapsed since the time of receiving the last interaction metrics 236A-N has elapsed by at least a predefined time threshold. In some implementations, the resource request module 212 can receive the updated interaction metrics 236A-N. In some implementations, the resource request module 212 can receive the one or more interaction metrics 236A-N, responsive to the data processing system 110 determining that the interaction data has changed by at least a predefined metric threshold between the second time and the first time. In some implementations, the resource request module 212 can receive the one or more interaction metrics 236A-N, responsive to the data processing system 110 determining that a predefined time threshold has lapsed between the first time and the second time.

In some implementations, the resource request module 212 can receive the visualization interface element 226 of the interaction statistics visualization script 220. The visualization interface element 226 can include one or more actionable items. Example of actionable items include command buttons, radio buttons, check boxes, or any other graphical user interface element. In some implementations, the one or more actionable items may be configured to cause the resource modifier module 224 to set a visual property of each of the content elements 218A-N based on the corresponding type of interaction metric 236A-N using the visual styles 238A-N. For example, one actionable item may cause the resource modifier module 224 to set the visual property of content element 215A based on the hover rate for the content element 215A, while another actionable item may cause the resource modifier module 224 to set the visual property of the content element 215A based on the click rate for the content element 215A. In some implementations, the one or more actionable items may be configured to cause the resource modifier module 224 to set the visual property of each of the content elements 218A-N based on the client device segment using the visual styles 238A-N. In some implementations, the one or more actionable items may be configured to cause the resource modifier module 224 to set each of the one or more content elements 218A-N to a default visual style or one of the visual styles 238A-N based on the one or more interaction metrics 236A-N. Details regarding the resource modifier module 224 may be found below.

The element mapper module 222 can identify the one or more content elements 218A-N for the corresponding one or more interaction metrics 236A-N based on the corresponding content element identifier. In some implementations, the element mapper module 222 can search for the one or more content elements 218A-N for the corresponding one or more interaction metrics 236A-N based on the corresponding content element identifier. For example, the element mapper module 222 can access a data structure storing the interaction metrics 236A-N and the content element identifiers. In this example, using the content element identifier from the data structure, the element mapper module 222 can search to find the corresponding content element 218A-N by iterating through the one or more content elements 218A-N using the counter 228. In some implementations, the element mapper module 222 can identify the one or more interaction metrics 236A-N for each of the one or more content elements 218A-N based on the corresponding content element identifier.

The element mapper module 222 can determine or identify which of the one or more content elements 218A-N are actionable. Actionable content elements 218A-N can include those content elements 218A-N, event listeners of which are enabled. The element mapper module 222 can determine or identify which of the one or more content elements 218A-N are non-actionable. Non-actionable content elements 218A-N can include those content elements 218A-N, the event listeners of which are disabled. In some implementations, non-actionable content elements 218A-N can also include those content elements 218A-N that do not specify any further instructions or executable logic upon triggering of event listeners for the respective content element 218A-N. For example, a body text content element 218A on the information resource 216 may include code specifying no further actions are to be taken upon the triggering of an "onClick" event listener. In some implementations, the element mapper module 222 can determine which of the one or more content elements 218A-N are non-actionable based on a corresponding element type of the content element 218A-N.

The element mapper module 222 can determine which range of one or more ranges of interaction metrics each of the one or more interaction metrics 236A-N is within. The one or more ranges of interaction metrics can be in quantiles (e.g., tertiles, quartiles, deciles, etc.), or in uneven predefined ranges of any type of interaction metrics (e.g., hover rate, click-through rate, scroll on rate, etc.). In some implementations, the one or more ranges of interaction metrics may be defined using variance measures (e.g., 1-sigma, 2-sigma, etc.) of the corresponding interaction metrics 236A-N. In some implementations, the element mapper module 222, using the comparator 230, can compare the one or more interaction metrics 236A-N with the one or more ranges of interaction metrics. For example, one of the interaction metrics 236B may be a hover rate and may indicate that content element 215B has the hover rate of 0.62, and the ranges of interaction metrics may be in quartiles. In this example, the element mapper module 222 can compare the hover rate 0.62 for content element 215B to each of the ranges of interaction metrics, and determine that the hover rate is within the second top quartile. In some implementations, the element mapper module 222 can determine which range of the one or more ranges of interaction metrics each of the one or more interaction metrics 236A-N is within per client device segment. The element mapper module 222 can compare the corresponding interaction metrics 236A-N among the content elements 218A-N. In some implementations, the element mapper module 222 can determine whether the corresponding interaction statistic 236A-N for one content element 218A-N is different from the corresponding interaction statistic 236A-N for another content element 218A-N by at least a predefined interaction statistic threshold.

The resource modifier module 224 can modify properties of each of the one or more content elements 218A-N of the information resource 216A-N based on the interaction metrics 236A-N and the visual styles 238A-N. The resource modifier module 224 can set a visual property of each of the one or more content elements 218A-N to one of the one or more visual styles 238A-N based on determining which range of the one or more ranges of interaction metrics each of the one or more interaction metrics 236A-N for the corresponding content element 218A-N is within. The visual property of each of the one or more content elements 218A-N may include color property, shade property, texture property, or gradient property, among others. The visual property of each of the one or more content elements 218A-N can include a default visual style. The one or more visual styles 238A-N can include a data structure (e.g., array, list, linked list, tree, matrix, table, etc.), entries of which can include visual property specifier for modifying visual properties of the content elements 218A-N and a corresponding range of interaction metrics.

In some implementations, the resource modifier module 224 can set a color property of each of the one or more content elements 218A-N to a color value different from the default color property for the respective content element 218A-N and color properties of each of the other one or more content elements 218A-N. For example, one visual style 238A-N may indicate that the background color content elements 218A-N with click rates between 80%-92% are to be set to red, while another visual style 238A-N may indicate that content elements 218A-N with click rates between 10%-23% are to be set to light green. The color value may be represented as a tuple value (e.g., RGB), hexadecimal color value (e.g., HTML #RRGGBB), or any other suitable identifier for representing colors. In some implementations, the resource modifier module 224 can insert an overlay content element positioned over the respective content element 218A-N.

The resource modifier module 224 can insert one or more overlay content elements for each of the one or of the one more visual styles 238A-N onto the information resource 216 based on determining which range of the one or more ranges of interaction metrics the interaction metric 236A-N for the corresponding, underlying content element 218A-N is within. In some implementations, the resource modifier module 224 can identify the position and dimensions of each of the one or more content elements 218A-N. In some implementations, the resource modifier module 224 can identify the respective visual style 238A-N for the each of the one or more content elements 218A-N based on the one or more ranges of interaction metrics the interaction metrics 236A-N is within. In some implementations, the resource modifier module 224 can instantiate each of the one or more overlay content elements with the position and dimension of the respective content element 218A-N and the visual style 238A-N identified for the respective content element 218A-N.

In some implementations, the resource modifier module 224 can set the visual property of each of the one or more content elements 218A-N to one of the one or more visual styles 238A-N, responsive to identifying that the corresponding content element 218A-N is actionable. In some implementations, the resource modifier module 224 can maintain the visual property of each of the one or more content elements 218A-N to the respective default visual style, responsive to identifying that the corresponding content element 218A-N is non-actionable. For example, the information resource 216 may include a body text content element 218A that may be non-actionable and a command button content element 218B that may be clicked. In this example, the resource modifier module 224 can identify that the body text content element 218A is not non-actionable and that the command button content element 218B is actionable. Subsequently, the resource modifier module 224 can alter or change the command button content element 218B according to the visual style 238A-N based on the corresponding interaction metrics 236A-N, and also maintain the default visual style of the body text content element 218A.

The resource modifier module 224 can insert the visualization interface element 226 into the information resource 216. The visualization interface element 226 can include the one or more actionable items configured to set the visual properties of each of the one or more content elements 218A-N on the information resource 216. In some implementations, the one or more actionable items can correspond to each of the plurality of client device segments for the interaction metrics 236A-N. In some implementations, the one or more actionable items can be configured to set the visual properties of each of the one or more content elements 218A-N to the default visual style or the one or more visual styles 238A-N of the visual style specifier. In some implementations, the one or more actionable items can correspond to each type of interaction metric of the one or more interaction metrics 236A-N.

The resource modifier module 224 can monitor for an event on at least one of the one or more actionable items corresponding to at least one of the plurality of client device segments for the interaction metrics 236A-N. In some implementations, the element mapper module 222, responsive to detecting the event on the at least one actionable item corresponding to at least one of the plurality of client device segments, can determine which range of interaction metrics the one or more interaction metrics 236A-N corresponding to the respective client device segment is within. In some implementations, the element mapper module 222 can identify the one or more content elements 218A-N corresponding to the one or more interaction metrics 236A-N corresponding to the respective client device segment. In some implementations, the resource modifier module 224 can set the one or more content elements 218A-N to one of the one or more visual styles 238A-N corresponding to the range of interaction metrics that the one or more interaction metrics 236A-N corresponding to the respective client device segment is within.

The resource modifier module 224 can monitor for an event on at least one of the one or more actionable items corresponding to each type of interaction metrics. The one or more actionable items may be configured to set each one of the one or more content elements 218A-N to one of the one or more visual styles 238A-N corresponding to the respective interaction metric 236A-N for the type of interaction metric, responsive to detecting the event. In some implementations, the element mapper module 222, responsive to detecting the event on the at least one of the one or more actionable items corresponding to the respective type of interaction metrics, can identify the respective interaction metric 236A-N of the one or more interaction metrics 236A-N. In some implementations, the element mapper module 222 can identify the one or more content elements 218A-N corresponding to the respective interaction metric 236A-N for the respective type of interaction metrics. For example, a first actionable item on the interaction visualization interface element 226 may correspond to a hover rate type interaction metric, while a second actionable item may correspond to a click rate type interaction metric. In this example, if the resource modifier module 224 detects a key press or click on the first actionable item, the element mapper module 222 can identify the hover rates for the content elements 218A-N from the interaction metrics 236A-N and the range of hove rates that the identifier hover rates for each of the content elements 218A-N is within. Subsequently, the resource modifier module 224 can set each content element 218A-N to the visual style 238A-N corresponding to the range of hover rates.

The resource modifier module 224 can monitor for an event on at least one of the one or more actionable items configured to set the visual property of each of the one or more content elements 218A-N to the default visual style or the one or more visual styles 238A-N of the visual style specifier. In some implementations, the resource modifier module 224, responsive to detecting the event on the at least one of the one or more actionable items, can determine whether each of the one or more content elements 218A-N are set to the default visual style or to one of the one or more visual styles 238A-N. In some implementations, the resource modifier module 224 can save or otherwise store the default visual styles of each one of the one or more content elements 218A-N. In some implementations, the resource modifier module 224 can compare the stored default visual style to current visual style for the one or more content elements 218A-N. In some implementations, the resource modifier module 224, responsive to determining that each of the one or more content elements 218A-N is set to one of one or more visual styles 238A-N or set to a visual style different from the default visual style, can set each of the one or more content elements 218A-N to the respective default visual style. In some implementations, the resource modifier module 224, responsive to determining that each of the one or more content elements 218A-N is set to the respective default visual style, can set each of the one or more content elements 218A-N to one of the one or more visual styles 238A-N based on which of the one or more ranges of interaction metrics the respective interaction metrics 236A-N for the respective content element 218A-N is within.

The resource modifier module 224 can monitor for an event on any of the one or more content elements 218A-N. The event on the one or more content elements 218A-N may be detected via an event listener or handler, and may include, for example, a click, a scroll on, a hover over, or a key press, among others. In some implementations, the resource modifier module 224 can identify the respective content element 218A-N corresponding to the event, responsive to detecting the event. In some implementations, the resource modifier module 224 can insert a text element over the information resource 216, responsive to detecting the event. The text element may be positioned over the respective content element 218A-N corresponding to the event, overlapping with the respective content element 218A-N, or adjacent to the respective content element 218A-N. The text element may be, for example, a tool tip, a new text content element inserted into the information resource 216, or a hover box element, among others. The text element can include a plurality of characters or a string including the interaction metrics 236A-N corresponding to the respective content element 218A-N.

The rendering engine 214 can render and display the information resource 216 including the one or more content elements 218A-N set to the respective visual style or the one or more visual styles 238A-N based on which range of the interaction metrics the corresponding interaction metric 236A-N is within. In some implementations, the rendering engine 214 can dynamically update the rendering and displaying of the information resource 216. For example, if the resource request module 212 receives another content element 218A-N to insert or include into the information resource 216, the rendering engine 214 can render the additional content element 218A-N upon insertion or inclusion into the information resource 216. In some implementations, the rendering engine 214 can update the rendering and display of the one or more content elements 218A-N, responsive to the resource modifier module 224 setting or resetting the visual styles of the respective content elements 218A-N.

In some implementations, the element mapper module 222 can compare the one or more interaction metrics 236A-N received from the data processing system 110 over time. In some implementations, the element mapper module 222 can identify a subset of the one or more interaction metrics 236A-N that change over time by at least a predefined margin. In some implementations, the element mapper module 222 can identify a subset of the one or more content elements 218A-N corresponding to the subset of interaction metrics 236A-N that change by the predefined margin. In some implementations, the resource modifier module 224, responsive to determining that the subset of the one or more interaction metrics 236A-N changes over time by at least the predefined margin or margins, can include or insert a difference indicator element onto information resource 216. The difference indicator element may be positioned over, overlapping with, or adjacent to the respective content elements 218A-N. For example, the hover rate for a content element 218A-N may be 0.32 at a first time and then 30 minutes later change to 0.74. If the predefined margin is 0.2, the element mapper module 222 can identify the hover rate for the content element 218A-N as changing by the predefined margin. In this example, once the element mapper module 222 has identified the content element 218A-N corresponding to the hover rate that has changed by more than the predefined margin, the resource modifier module 224 can insert the difference indicator element over the content element 218A-N.

In some implementations, the element mapper module 222 can compare the one or more interaction metrics 236A-N among each of the client device segments. In some implementations, the interaction metrics 236A-N can include average interaction metrics over all client device segments. In some implementations, the element mapper module 222, responsive to detecting the event on the at least one actionable item of the interaction statistics visualization interface 226 corresponding to at least one of the plurality of client device segments, can identify the one or more interaction metrics 236A-N corresponding to the respective client device segment. The element mapper module 222 can compare each of the interaction metrics 236A-N for each respective client device segment to thee average interaction metrics. The resource modifier module 224, responsive to comparing each of the interaction metrics 236A-N for each respective client device segment to the average interaction metrics, can insert a difference indication element onto the information resource 216. The difference indicator element may be positioned over, overlapping with, or adjacent to the respective content elements 218A-N. The difference indicator may indicate whether the client device segment has interaction metrics 236A-N different from the average interaction metrics by at least a predefined margin or margins.

The functionalities of the application 210, the resource request module 212, the rendering engine 214, the information resource 216, the one or more content elements 218A-N the interaction statistics visualization script, the element mapper module 222, the resource modifier module 224, the visualization interface element 226, the counter 228, the comparator 230, the timer 232, the interaction statistics storage 234, the interaction metrics 236A-N, and the visual styles 238A-N may be repeated over time. In this way, the interaction statistics visualization script 220 may maintain the other, pre-specified run-time functionalities of the information resource 216 displayed via the application 210 on a computing device (e.g., the content administrator device 145). At the same time, the interaction statistics visualization script 220 may dynamically display the interaction metrics 236A-N for each of the content elements 218A-N by updating and setting the content elements 218A-N to one of the visual styles 238A-N. The interaction statistics visualization script 220 may thus improve the display functionality of the computing device and enhance human-computer interactions (HCI) with the application 210 and the information resource 216.

Figure 3A:
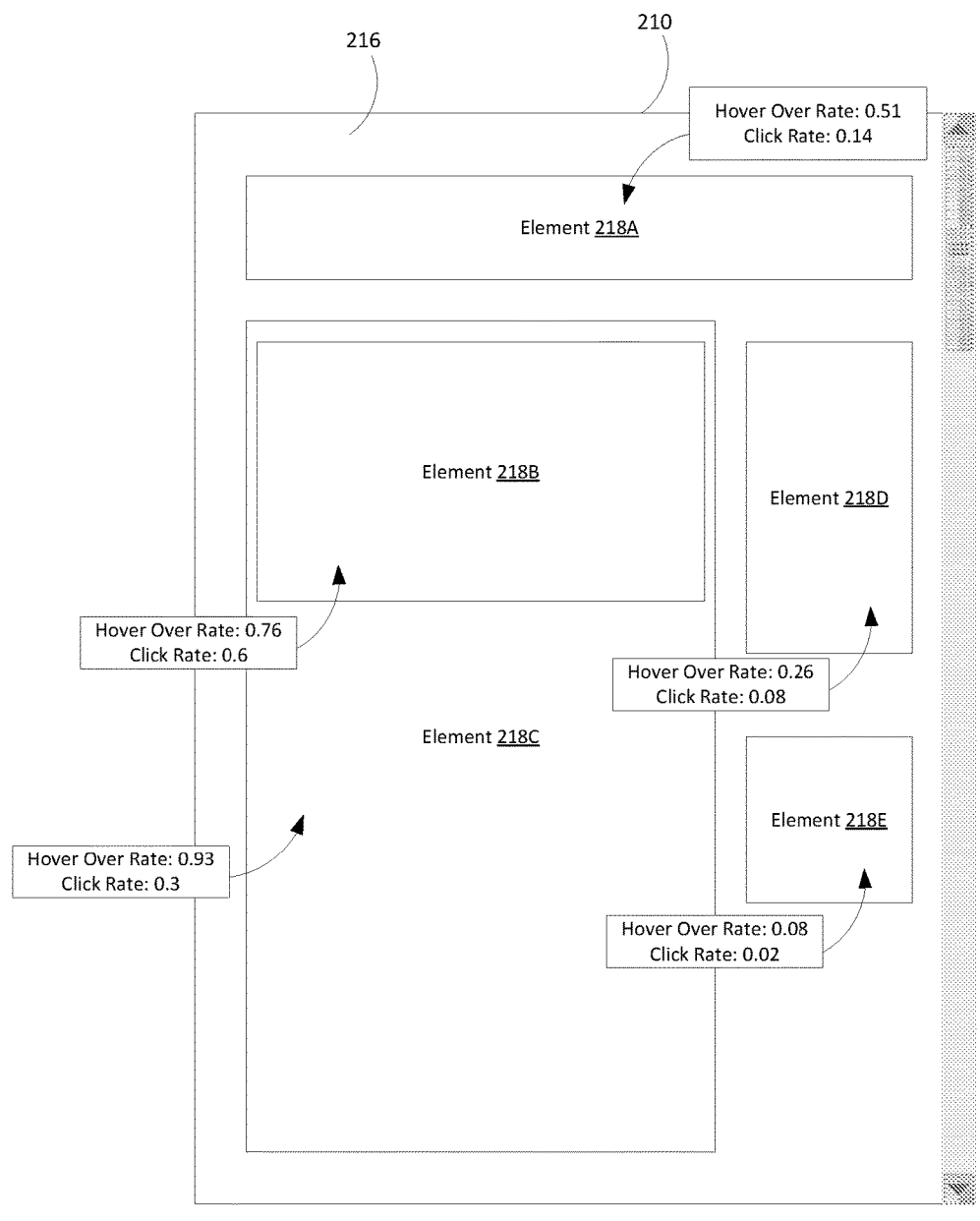
FIG. 3A is a block diagram depicting an information resource with content elements and interaction metrics for each content element, according to an illustrative implementation.

Referring to FIG. 3A, FIG. 3A is a block diagram depicting one implementation of an information resource 216 with content elements 218A-E and interaction metrics 236A-N for each content element 218A-E. In the example depicted in FIG. 3A, each of the content elements 218A-E may be initially set to the default visual styles. The first content element 218A may have a hover over rate of 0.51 and a click rate of 0.14, the second content element 218B may have a hover over rate of 0.76 and a click rate of 0.6, the third content element 214C may have a hover rate of 0.93 and a click rate of 0.3, the fourth content element 218D may have a hover over rate of 0.236 and a click rate of 0.08, and the fifth content element 218E may have a hover over rate of 0.08 and a click rate of 0.02. The interaction metrics 236A-N may be at a first time. The first content element 218A may be a canvas element located generally along the top of the information resource 216. The second content element 218B may be a video element located generally above the middle and aligned to the left on the information resource 216. The third content element 218C may be a body text element located generally in the middle and aligned to the left on the information resource 216. The fourth content element 218D may be an inline frame element located generally above the middle and aligned to the right on the information resource 216. The fifth content element 218E may be a text element 218E located generally below the middle and aligned to the right on the information resource 216. The first, second, fourth, and fifth content elements 218A, 218B, 218D, and 218E may be actionable, while the third content element 218C may be non-actionable. In the context of FIGS. 1 and 2, the resource request module 212 of the application 210 of the content administrator device 145 may have received the hover rates and click rates for content elements 218A-E from an interaction log system such as the data processing system 110. Using the received hover over rates, click rates, and the visual style specifier, the element mapper module 222 and the resource modifier module 224 can dynamically set the visual styles of the content elements 218A-E.

Figure 3B:
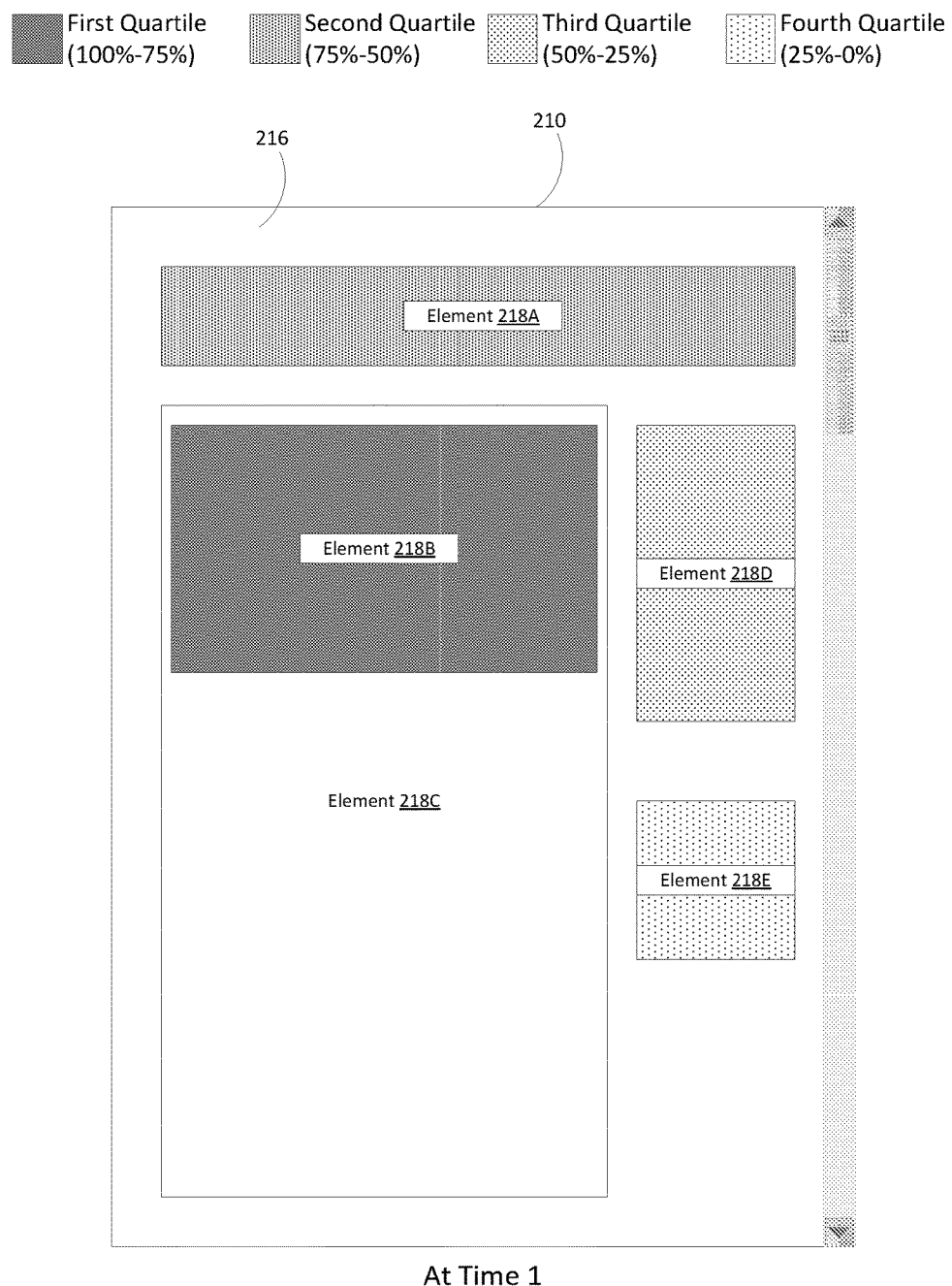
FIG. 3B is a block diagram depicting the information resource with visual styles of the content elements altered based on the respective interaction metrics at a first time, according to an illustrative implementation.

Referring to FIG. 3B, FIG. 3B is a block diagram depicting one implementation of the information resource 216 with visual styles of the content elements 218A-E altered based on the respective interaction metrics 236A-N at a first time. FIG. 3B shows four of the five content elements 218A, 218B, 218D, and 218D set to a visual style different from the default visual style. In the example depicted in FIG. 3B, the visual style specifier may define certain dotted pattern with varying densities based on which quartile the respective hover rate for each content element 218A-E is within. In the context of FIGS. 1 and 2, the element mapper module 222 may identify that four of the five content elements 218A, 218B, 218D, and 218E are actionable and that one of the content elements 218C is non-actionable, and proceed to determine the quartiles for the hover rates for the four content elements 218A, 218B, 218D, and 218E. The element mapper module 222 may determine that the hover rate for the first content element 218A (0.51) is within the second quartile, that the hover rate for the second content element 218B (0.76) is within the first quartile, that the hover rate for the fourth content element 218D (0.26) is within the third quartile, and that the hover rate for the fifth content element 218E (0.08) is within the fourth quartile. Using the content element-quartile mappings, the resource modifier module 224 may then set the four content elements 218A, 218B, 218D, and 218E to the visual style 238A-N corresponding to the quartiles.

Figure 3C:
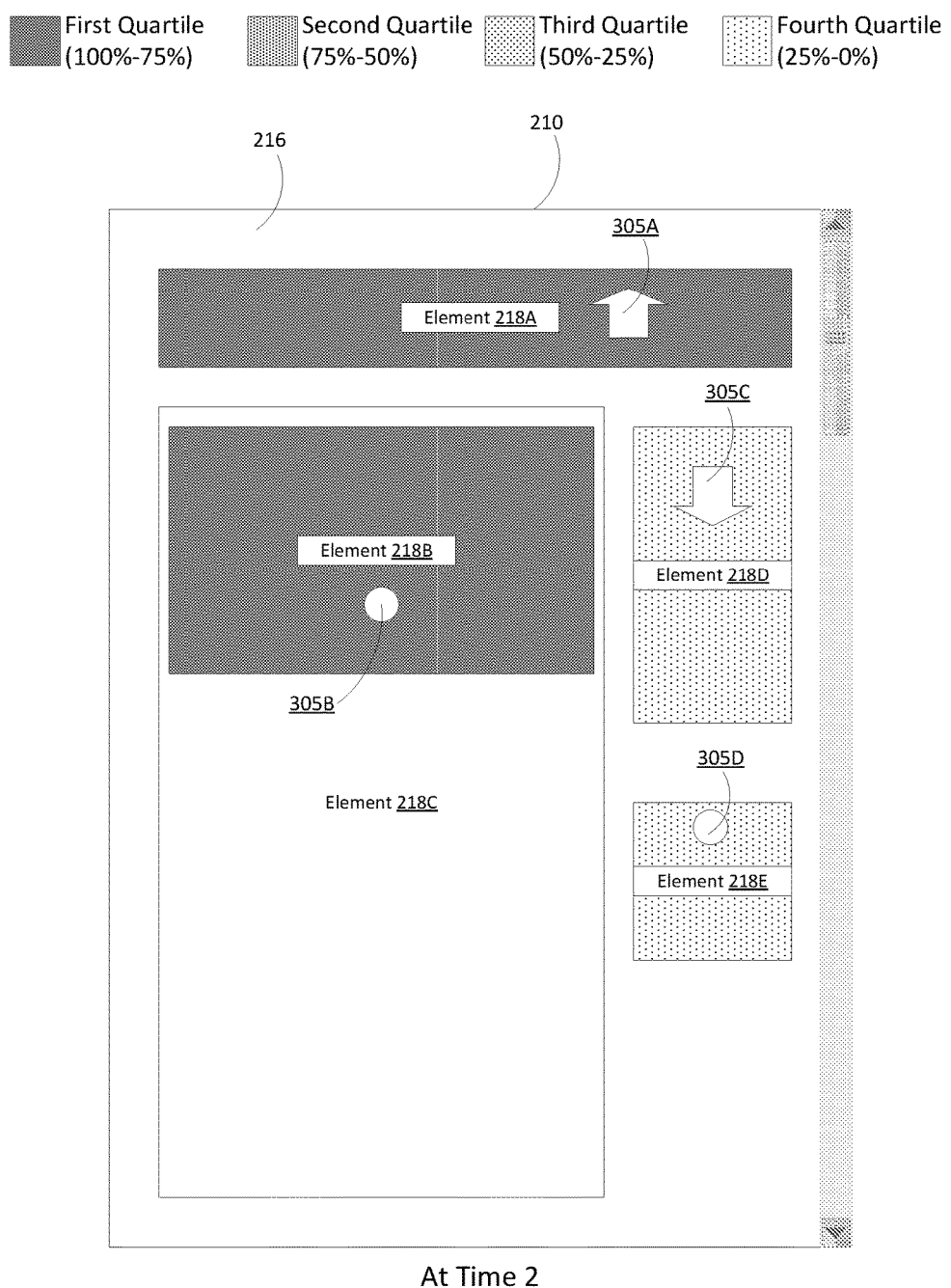
FIG. 3C is a block diagram depicting the information resource with visual styles of the content elements altered based on the respective interaction metrics along with indicators identifying changes in the interaction metrics from the first time to the second time, according to an illustrative implementation.

Referring to FIG. 3C, FIG. 3C is a block diagram depicting one implementation of the information resource 216 with visual styles of the content elements 218A-E altered based on the respective interaction metrics 236A-N along with indicators 305A-D identifying changes in the interaction metrics 236A-N from the first time to the second time. In the context of FIGS. 1 and 2, the resource request module 212 may have again received updated interaction metrics 236A-N from the data processing system 110 at a subsequent point in time. The data processing system 110 may have determined that the interaction metrics 236A-N has changed by at least a predefined metric threshold or that the time elapsed since time 1 is above a predefined time threshold. The element mapper module 222 can determine that the interaction metrics 236A-N at the second time may indicate that the hover rate for the first element 218A has increased from the second quartile to the first quartile, that the hover rate for the second content element 218B has remained the same, that the hover rate for the fourth content element 218D has decreased from the third quartile to the fourth quartile, and that the hover rate for the fifth content element 218E has also remained the same. Using the updated content element-quartile mappings, the resource modifier 224 can set the visual styles of the four content elements 218A, 218B, 218D, and 218E to the visual style 238A-N corresponding to the new quartiles. The resource modifier module 224 can also insert difference indicators 305A-D identifying the changes in the interaction metrics 236A-N for the content elements 218A, 218B, 218D, and 218E from the previous interaction metrics 236A-N. The difference indicators 305A-D may be instantiations of new content elements inserted into the document model object (DOM) tree for the information resource 216. In the example depicted in FIG. 3C, the first difference indicator 305A may be an upward arrow indicating that the interaction metric 236A-N for the first content element 218A has increased from the first time to the second time. The second difference indicator 305B and the fourth difference indicator 205D may be a circle indicating that the interaction metrics 236A-N for the second content element 218B and the fifth content element 218E respectively has remained in the same quartile from the first time to the second time. The third difference indicator 305C may be a downward arrow indicating that the interaction metric 236A-N for the fourth content element 218D has decreased from the first time to the second time. The visual shapes for the difference indicators 305A-D may be other shapes, such as rectangles, diamonds, and triangles, among others.

Figure 3D:
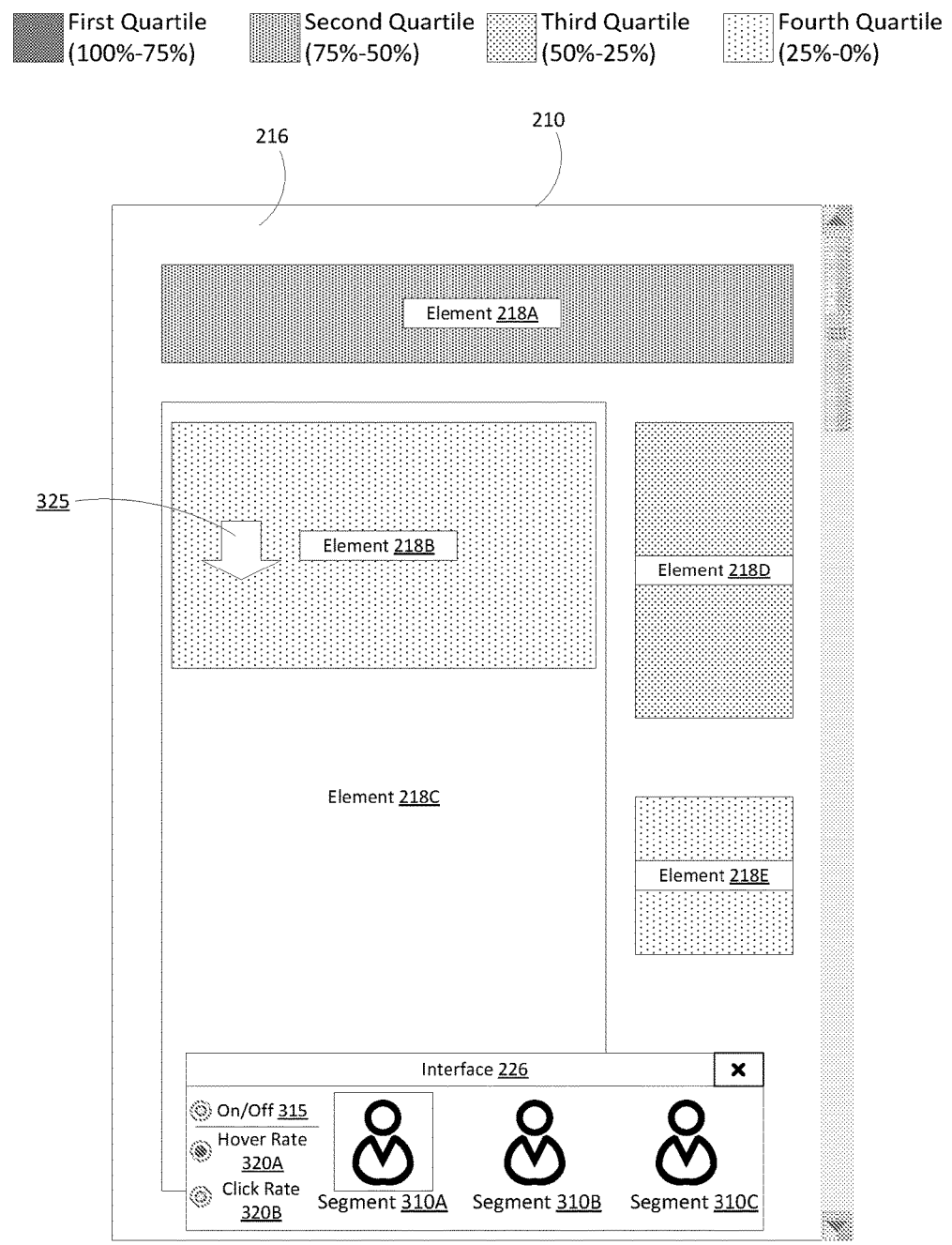
FIG. 3D is a block diagram depicting the information resource with visual styles of the content elements altered based on the respective interaction metrics along with an interface 226 for selecting client device segments, according to an illustrative implementation.

Referring to FIG. 3D, FIG. 3D is a block diagram depicting one implementation of the information resource 216 with visual styles of the content elements 218A-E altered based on the respective interaction metrics 236A-N along with an interface 226 for selecting client device segments 310A-C. In the example depicted in FIG. 3E, the interaction visualization interface 226 can include: an on/off radio button 31, two radio buttons 320A and 320B corresponding to two different types of interaction metrics 236A-N (e.g., hover rates and click rates), and three command buttons 310A-C corresponding to three different client device segments from the client devices 125A-N (e.g., a first client device segment, second client device segment, and third client device segment). The interaction visualization interface 226 can be an overlay element inserted into the information resource 216 The interaction visualization interface 226 can be used to control which interaction metrics 236A-N control the visual styles of the content elements 218A, 218B, 218D, and 218E. As depicted in FIG. 3D, the radio button 230A for hover rate and the command button 310A for first client device segment may have been selected. In the context of FIGS. 1 and 2, the element mapper module 222 can identify the hover rates for the first client device segment corresponding to the command button 310A selected on the interface 226. The element mapper module 222 can then determine quartile the hover rates for the first client device segment is within. The element module 222 can also determine whether the quartile has decreased compared to the average hover rate over the client device segments. The resource modifier module 224 can set the visual styles of the content elements 218A, 218B, 218C, and 218E based on the determined quartiles for the hover rates for the first client device segment. The resource modifier module 224 can also insert a difference indicator 325 over content element 218B identifying that the hover rate for the second content element 218B is lower than the average hover rate over the client device segments.

Figure 3E:
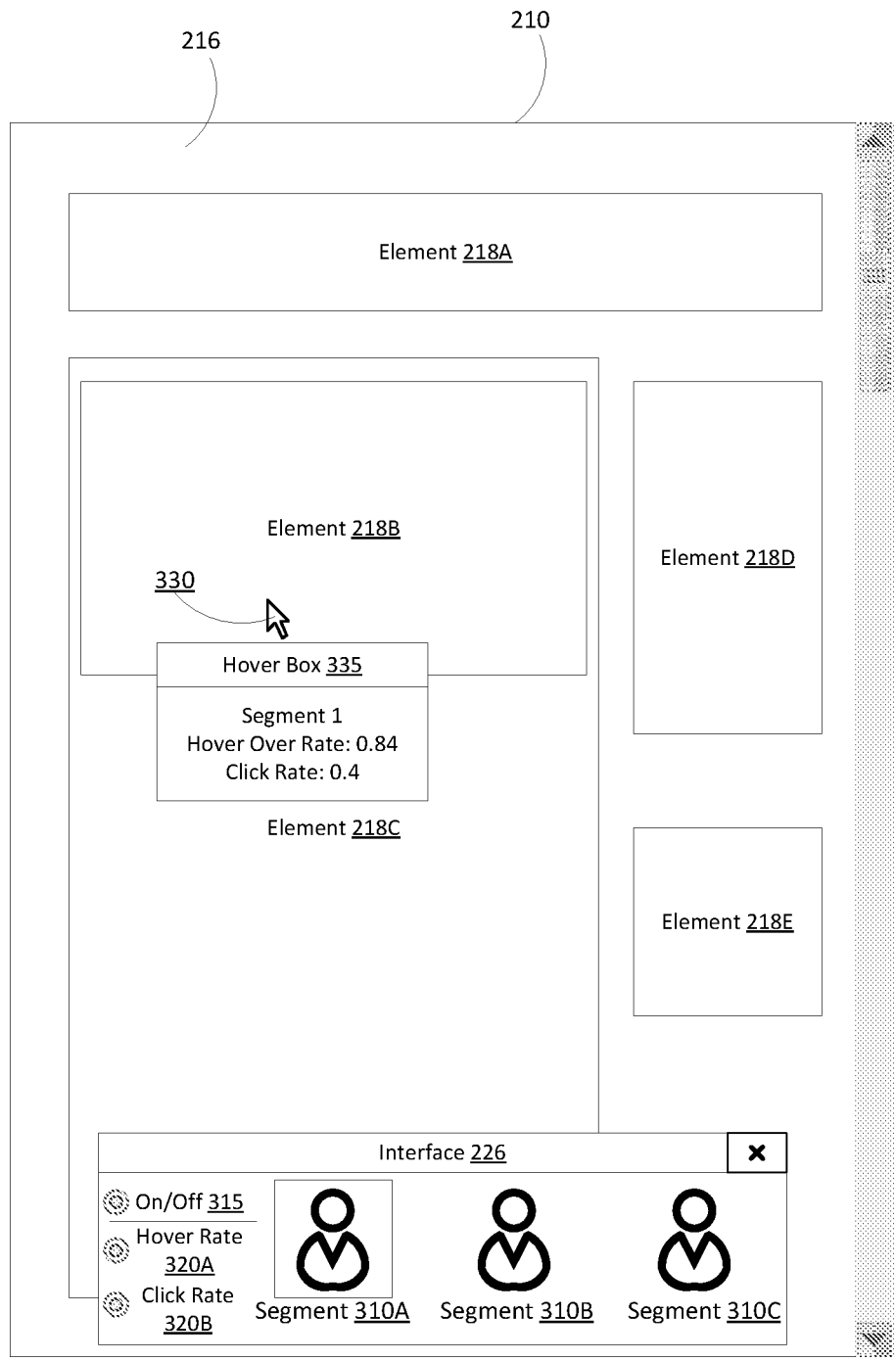
FIG. 3E is a block diagram depicting the information resource with the default visual styles of the content elements along with an information element indicating the respective interaction metrics, according to an illustrative implementation.

Referring to FIG. 3E, FIG. 3E is a block diagram depicting one implementation the information resource 216 with the default visual styles of the content elements 218A-E along with an information element 325 indicating the respective interaction metrics 236A-E. In relation to FIG. 3D, the on/off radio button 315 is now unselected and the command button 310A corresponding to the first client device segment is still selected. In the context of FIGS. 1 and 2, the resource modifier 224 can set the visual styles of the content elements 218A-E of the information resource 216 to the respective default visual styles. Additionally, the example depicted in FIG. 3D also includes a cursor 330 generally over the second content element 218B and a hover box 335 generally overlapping with the second content element 218B. The hover box 335 can include characters, string, or otherwise text showing the interaction statistics of the second content element 218B, such as the hover rate and the click rate for the first client device segment.

Figure 4:
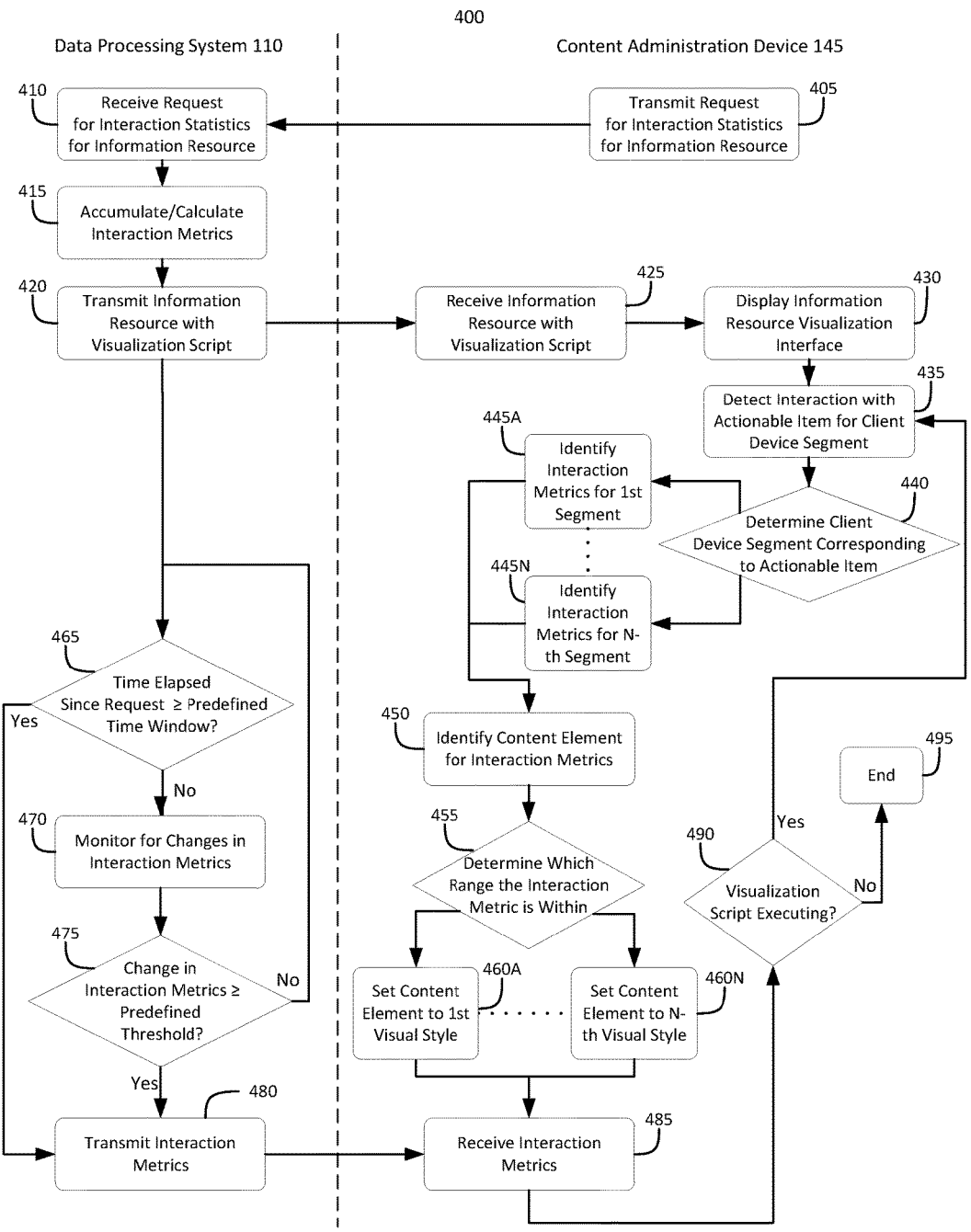
FIG. 4 is a flow diagram depicting dynamically rendering webpage interaction statistics data over graphical user interfaces in a computer network environment, according to an illustrative implementation.

FIG. 4 is a flow diagram depicting one implementation of a method of dynamically rendering webpage interaction statistics data over graphical user interfaces in a computer network environment. The functionality described herein described in the method 400 can be performed by data processing system 110, content provide devices 115A-N, content publisher devices 120A-N, client devices 125A-N, and the content administrator device 145, or any one or more components or modules of the system 100 shown in FIG. 1 or of the system 200 in FIG. 2.

In brief overview, a computing device (e.g., content administrator device 145) can transmit a request for interaction statistics for an information resource (ACT 405). The data processing system (e.g., data processing system 110) can receive the request for interaction statistics for the information resource (ACT 410). The data processing system can accumulate or calculate interaction statistics (ACT 415). The data processing system can transmit the information resource with the interaction visualization script (ACT 420). The computing device can receive the information resource with the visualization script (ACT 425). The computing device can display the information resource with the interaction visualization interface (ACT 430). The computing device can detect an interaction with an actionable item on the visualization interface for a client device segment (ACT 435). The computing device can identify the client device segment corresponding to the actionable item (ACT 440). The computing device can identify interaction metrics for the identified client device segment (ACT 445A-N). The computing device can identify a respective content element for the interaction metrics (ACT 450). The computing device can determine which range of interaction statistics the interaction metric is within (ACT 455). The computing device can set the content element to a visual style based on the determined range of interaction statistics (ACT 460A-N). The data processing system can determine whether the time elapsed since the request for interaction statistics is greater than or equal to a predefined time threshold (ACT 465). If the time has elapsed since the request for interaction statistics is less than the predefined time threshold, the data processing system can monitor for changes in interaction metrics (ACT 470). The data processing system can determine whether the change in interaction metrics is greater than or equal to a predefined metric threshold (ACT 475). If the time has elapsed since the request for interaction statistics is greater than the predefined time threshold or the change in interaction metrics is greater than the predefined metric threshold, the data processing system can transmit updated interaction metrics (ACT 480). The computing device can receive interaction metrics (ACT 485). The computing device can determine whether the interaction visualization script is executing (ACT 490). If the interaction visualization script is no longer executing, the computing device can end the process (ACT 495).

A computing device (e.g., content administrator device 145) can transmit a request for interaction statistics for an information resource (ACT 405). The data processing system (e.g., data processing system 110) can receive the request for interaction statistics for the information resource (ACT 410). The request for interaction statistics can include an information resource identifier or content element identifier. The information resource identifier can correspond to an information resource (e.g., webpage) to be displayed on the computing device. The information resource identifier can include, for example, a resource address (e.g., Uniform Resource Locator (URL)) or any alphanumerical identifier. The content element identifier can correspond to any of the one or more content elements on the information resource. The content element identifier can include, for example, a resource address (e.g., URL) or any alphanumerical identifier. In some implementations, the request for interaction statistics can further include a specified time threshold. The one or more interaction metrics can include click-through rate (CTR), hover-over rate, scroll-over rate, impression rate, and key press rate, among others.

The data processing system can accumulate or calculate interaction statistics (ACT 415). The data processing system can receive a ping or interaction indicator indicating interaction on the information resource or the content element of the information resource from a plurality of client devices. The information resource or the content element transmitted to the client device can include a pingback script. Once loaded onto the client device, the pingback script can transmit a ping or an interaction identifier indicating interaction by the client device on the respective content element. The ping or the interaction indicator can include an information resource identifier, a content element identifier, an interaction type, a client device identifier, timestamp, and other metadata. The content element identifier can correspond to the content element upon which the client device detected an event on. The interaction type can identify which event was detected by the client device from an input-output device such as a mouse, keyboard, and touchscreen among others. The detected event may include, for example, click, touch, hover over, hover out, key press, mouse wheel, and scrolling, among others. The client device can correspond to a unique alphanumerical identifier or a device address (e.g., IP or MAC address) corresponding to the client device. The timestamp can include the time at which the event was detected by the client device. Examples of metadata included in the ping or the interaction indicator may include a location identifier, device type identifier, application identifier, and account identifier, among others.

Upon receiving the ping or interaction indicator, the data processing system can save, update, or otherwise write onto the interaction log of the database. In some implementations, the data processing system can create or generate an entry including the information resource identifier, the content element identifier, the interaction type, the client device identifier, and the timestamp from the ping or the interaction indicator. In some implementations, the data processing system can process the fields of the ping or the interaction indicator prior to recording the fields onto the interaction log of the database. In some implementations, the data processing system can generate an entry using a subset of the fields in the ping or the interaction indicator. For example, the data processing system can record the information resource identifier, the content element identifier, and timestamp, while not saving the client device identifier and the interaction type. In some implementations, the data processing system can identify a range of times corresponding to the time stamp and then record the corresponding range of time for the entry in the interaction log.

The data processing system can maintain the interaction log by one or more client device segments. In some implementations, the data processing system can save, update, or otherwise write the ping or the indication indicator onto the interaction log of the database arranged by the one or more client device segments. The one or more client device segments may be based on the location identifier, device type identifier, and the account identifier included in the metadata of the ping or the interaction indicator. In some implementations, the data processing system can save, update, or otherwise write the ping or the indicator into separate data structures in the interaction log of the database. For example, if the data processing system receives one ping with the device type identifier "mobile phone" and another ping with the device type identifier "laptop," the data processing system can append one entry for the ping with the device type identifier "mobile phone" onto a data structure for mobile phones on the interaction log and append another entry for the ping with the device type identifier "laptop" onto a separate, corresponding data structure for laptops on the interaction log of the database.

The data processing system can transmit the information resource with the interaction visualization script (ACT 420). The data processing system can transmit the information resource or the content element including the interaction statistics visualization script to the content provider devices, the content publisher devices, the client devices, or the computing device associated with the request for interaction statistics. In some implementations, the data processing system can transmit the interaction statistics visualization script without the information resource or the content element to the content provider devices, the content publisher devices, the client devices, or the computing device. In some implementations, the data processing system can transmit the interaction statistics visualization script to one of the content provider devices or the content publisher devices associated with the request for interaction statistics. Receipt of the interaction statistics visualization script can cause the respective content provider device or the content publisher device to insert the interaction statistics visualization script into the information resource or the content element and transmit the information resource or the content element with the interaction statistics visualization script to any one of the client devices or the computing device. In some implementations, the data processing system can transmit the interaction statistics visualization script or the one or more interaction metrics, responsive to the data processing system determining that the time elapsed since receiving the request for interaction statistics is greater than or equal to the predefined time threshold or determining that the one or more interaction statistics has changed by the predefined metric threshold.

In some implementations, the data processing system can retrieve, access, or receive the one or more interaction metrics calculated by the data processing system corresponding to the information resource identifier or the content element identifier. In some implementations, the data processing system can transmit a request to the data processing system or the database for the one or more interaction metrics corresponding to the information resource identifier or the content element identifier. In some implementations, the data processing system can subsequently receive the one or more interaction metrics from the data processing system or the database. The data processing system can insert, embed, append, or otherwise add an interaction statistics visualization script into the information resource or the content element.

The computing device can receive the information resource with the visualization script (ACT 425). The computing device can subsequently receive, via the network interface, from the data processing system, the information resource or the content element. The information resource can include one or more content elements and the interaction statistics visualization script, including the one or more interaction metrics and the one or more visual styles included in the style specifier. Each of the one or more content elements can correspond to a node of a document object model (DOM) tree and a cascading style sheets (CSS) style generated by the application. In some implementations, the content element can include the interaction statistics visualization script. Each of the one or more content elements can correspond to a content element identifier. In some implementations, a subset of the one or more content elements can be actionable, while another subset of the one or more content elements may be non-actionable. For example, a body text content element on the information resource may not have any instructions executed responsive to an event (e.g., click, key press, etc.) and may thus be considered non-actionable.

Each of the one or more interaction metrics can correspond to a respective content element of the one or more content elements. In some implementations, each of the one or more interaction metrics can include one or more types of interaction metrics accumulated by the data processing system for the respective content element. For example, one interaction metric for a content element may be a hover rate, while another interaction metric for the content element may be a click rate. In some implementations, the interaction metrics N may be stored on a data structure (e.g., array, list, linked list, tree, matrix, table, etc.) listing each of the interaction metrics and the corresponding content element identifier. In some implementations, subsets of the one or more interaction metrics can correspond to interaction metrics for a client device segment maintained by the database. The client device segment can correspond to a subset of the one or more client devices. For example, interaction metrics may correspond to interaction metrics for a subset of client devices associated with a particular geographic region. Each of the one or more visual styles can be included in a style specifier data structure (e.g., array, list, linked list, tree, matrix, table, etc.). Each of the one or more visual styles can be used to set the visual properties of the content elements and can correspond to a range of interaction metrics.

The computing device can receive the information resource, the one or more content elements, the interaction statistics visualization script, the one or more interaction metrics, or the visual styles of the visual specifier repeatedly. For example, the application may have loaded and may still display the information resource on the display of the computing device. Subsequently, the computing device can receive, from the data processing system, a second or updated version of the interaction statistics visualization script, the one or more interaction metrics, or the one or more visual styles. In some implementations, the computing device can, at a first time, receive the information resource or the content element. In some implementations, the computing device can, at a second time subsequent to the first time, receive the second version or updated version of the information resource, the content elements, the interaction statistics visualization script, the interaction metrics, or the visual styles of the visual specifier. In some implementations, the computing device can access the timer to retrieve time. The timer can include an application, service, server, daemon, routine, or other executable logic for maintaining time. In some implementations, using the timer, the computing device can transmit a request for interaction statistics, responsive to determining that the time elapsed since the time of receiving the last interaction metrics has elapsed by at least a predefined time threshold. In some implementations, the computing device can receive the updated interaction metrics. In some implementations, the computing device can receive the one or more interaction metrics, responsive to the data processing system determining that the interaction data has changed by at least a predefined metric threshold between the second time and the first time.

In some implementations, the computing device can receive the visualization interface element of the interaction statistics visualization script. The visualization interface element can include one or more actionable items. Example of actionable items include command buttons, radio buttons, check boxes, or any other graphical user interface element. In some implementations, the one or more actionable items may be configured to cause the computing device to set a visual property of each of the content elements based on the corresponding type of interaction metric using the visual styles. For example, one actionable item may cause the computing device to set the visual property of content element based on the hover rate for the content element, while another actionable item may cause the computing device to set the visual property of the content element based on the click rate for the content element. In some implementations, the one or more actionable items may be configured to cause the computing device to set the visual property of each of the content elements based on the client device segment using the visual styles. In some implementations, the one or more actionable items may be configured to cause the computing device to set each of the one or more content elements to a default visual style or one of the visual styles based on the one or more interaction metrics.

The computing device can insert the visualization interface element into the information resource. The visualization interface element can include the one or more actionable items configured to set the visual properties of each of the one or more content elements on the information resource. In some implementations, the one or more actionable items can correspond to each of the plurality of client device segments for the interaction metrics. In some implementations, the one or more actionable items can be configured to set the visual properties of each of the one or more content elements to the default visual style or the one or more visual styles of the visual style specifier. In some implementations, the one or more actionable items can correspond to each type of interaction metric of the one or more interaction metrics.

The computing device can display the information resource with the interaction visualization interface (ACT 430). The computing device can render and display the information resource including the one or more content elements. In some implementations, the computing device can dynamically update the rendering and displaying of the information resource. For example, if the computing device receives another content element to insert or include into the information resource, the computing device can render the additional content element upon insertion or inclusion into the information resource. In some implementations, the computing device can update the rendering and display of the one or more content elements, responsive to the computing device setting or resetting the visual styles of the respective content elements.

The computing device can detect an interaction with an actionable item on the visualization interface for a client device segment (ACT 435). The computing device can monitor for an event on at least one of the one or more actionable items corresponding to at least one of the plurality of client device segments for the interaction metrics. The computing device can monitor for an event on at least one of the one or more actionable items corresponding to each type of interaction metrics. The one or more actionable items may be configured to set each one of the one or more content elements to one of the one or more visual styles corresponding to the respective interaction metric for the type of interaction metric, responsive to detecting the event. In some implementations, the computing device, responsive to detecting the event on the at least one of the one or more actionable items corresponding to the respective type of interaction metrics, can identify the respective interaction metric of the one or more interaction metrics. In some implementations, the computing device can identify the one or more content elements corresponding to the respective interaction metric for the respective type of interaction metrics.

The computing device can identify the client device segment corresponding to the actionable item (ACT 440). In some implementations, the computing device, responsive to detecting the event on the at least one actionable item corresponding to at least one of the plurality of client device segments, can determine which range of interaction metrics the one or more interaction metrics corresponding to the respective client device segment is within.

The computing device can identify interaction metrics for the identified client device segment (ACT 445A-N). In some implementations, the computing device can identify the one or more content elements corresponding to the one or more interaction metrics corresponding to the respective client device segment. The computing device can identify a respective content element for the interaction metrics (ACT 450). The computing device can identify the one or more content elements for the corresponding one or more interaction metrics based on the corresponding content element identifier and the identified client device segment. In some implementations, the computing device can search for the one or more content elements for the corresponding one or more interaction metrics based on the corresponding content element identifier. For example, the computing device can access a data structure storing the interaction metrics and the content element identifiers. In this example, using the content element identifier from the data structure, the computing device can search to find the corresponding content element by iterating through the one or more content elements using the counter. In some implementations, the computing device can identify the one or more interaction metrics for each of the one or more content elements based on the corresponding content element identifier.

The computing device can determine which range of interaction statistics the interaction metric is within (ACT 455). The computing device can determine which range of one or more ranges of interaction metrics each of the one or more interaction metrics is within. The one or more ranges of interaction metrics can be in quantiles (e.g., tertiles, quartiles, deciles, etc.), or in uneven predefined ranges of any type of interaction metrics (e.g., hover rate, click-through rate, scroll on rate, etc.). In some implementations, the one or more ranges of interaction metrics may be defined using variance measures (e.g., 1-sigma, 2-sigma, etc.) of the corresponding interaction metrics. In some implementations, the computing device, using the comparator, can compare the one or more interaction metrics with the one or more ranges of interaction metrics. In some implementations, the computing device can determine which range of the one or more ranges of interaction metrics each of the one or more interaction metrics is within per client device segment. The computing device can compare the corresponding interaction metrics among the content elements. In some implementations, the computing device can determine whether the corresponding interaction metrics for one content element is different from the corresponding interaction metric for another content element by at least a predefined interaction statistic threshold.

The computing device can set the content element to a visual style based on the determined range of interaction statistics (ACT 460A-N). The computing device can modify properties of each of the one or more content elements of the information resource based on the interaction metrics and the visual styles. The computing device can set a visual property of each of the one or more content elements to one of the one or more visual styles based on determining which range of the one or more ranges of interaction metrics each of the one or more interaction metrics for the corresponding content element is within. The visual property of each of the one or more content elements may include color property, shade property, texture property, or gradient property, among others. The visual property of each of the one or more content elements can include a default visual style. The one or more visual styles can include a data structure (e.g., array, list, linked list, tree, matrix, table, etc.), entries of which can include visual property specifier for modifying visual properties of the content elements and a corresponding range of interaction metrics.

In some implementations, the computing device can set a color property of each of the one or more content elements to a color value different from the default color property for the respective content element and color properties of each of the other one or more content elements. The color value may be represented as a tuple value (e.g., RGB), hexadecimal color value (e.g., HTML #RRGGBB), or any other suitable identifier for representing colors. In some implementations, the computing device can insert an overlay content element positioned over the respective content element.

The computing device can insert one or more overlay content elements for each of the one or of the one more visual styles onto the information resource based on determining which range of the one or more ranges of interaction metrics the interaction metric for the corresponding, underlying content element is within. In some implementations, the computing device can identify the position and dimensions of each of the one or more content elements. In some implementations, the computing device can identify the respective visual style for the each of the one or more content elements based on the one or more ranges of interaction metrics the interaction metrics is within. In some implementations, the computing device can instantiate each of the one or more overlay content elements with the position and dimension of the respective content element and the visual style identified for the respective content element.

The computing device can monitor for an event on any of the one or more content elements. The event on the one or more content elements may be detected via an event listener or handler, and may include, for example, a click, a scroll on, a hover over, or a key press, among others. In some implementations, the computing device can identify the respective content element corresponding to the event, responsive to detecting the event. In some implementations, the computing device can insert a text element over the information resource, responsive to detecting the event. The text element may be positioned over the respective content element corresponding to the event, overlapping with the respective content element, or adjacent to the respective content element. The text element may be, for example, a tool tip, a new text content element inserted into the information resource, or a hover box element, among others. The text element can include a plurality of characters or a string including the interaction metrics corresponding to the respective content element.

In some implementations, the computing device can determine or identify which of the one or more content elements are actionable. Actionable content elements can include those content elements, event listeners of which are enabled. The computing device can determine or identify which of the one or more content elements are non-actionable. Non-actionable content elements can include those content elements, the event listeners of which are disabled. In some implementations, non-actionable content elements can also include those content elements that do not specify any further instructions or executable logic upon triggering of event listeners for the respective content element. For example, a body text content element on the information resource may include code specifying no further actions are to be taken upon the triggering of an "onClick" event listener. In some implementations, the computing device can determine which of the one or more content elements are non-actionable based on a corresponding element type of the content element.

In some implementations, the computing device can set the visual property of each of the one or more content elements to one of the one or more visual styles, responsive to identifying that the corresponding content element is actionable. In some implementations, the computing device can maintain the visual property of each of the one or more content elements to the respective default visual style, responsive to identifying that the corresponding content element is non-actionable. For example, the information resource may include a body text content element that may be non-actionable and a command button content element that may be clicked. In this example, the computing device can identify that the body text content element is not non-actionable and that the command button content element is actionable. Subsequently, the computing device can alter or change the command button content element according to the visual style based on the corresponding interaction metrics, and also maintain the default visual style of the body text content element.

In some implementations, the computing device can compare the one or more interaction metrics received from the data processing system over time. In some implementations, the computing device can identify a subset of the one or more interaction metrics that change over time by at least a predefined margin. In some implementations, the computing device can identify a subset of the one or more content elements corresponding to the subset of interaction metrics that change by the predefined margin. In some implementations, the computing device, responsive to determining that the subset of the one or more interaction metrics changes over time by at least the predefined margin or margins, can include or insert a difference indicator element onto information resource. The difference indicator element may be positioned over, overlapping with, or adjacent to the respective content elements.

In some implementations, the computing device can compare the one or more interaction metrics among each of the client device segments. In some implementations, the interaction metrics can include average interaction metrics over all client device segments. In some implementations, the computing device, responsive to detecting the event on the at least one actionable item of the interaction statistics visualization interface element corresponding to at least one of the plurality of client device segments, can identify the one or more interaction metrics corresponding to the respective client device segment. The computing device can compare each of the interaction metrics for each respective client device segment to thee average interaction metrics. The computing device, responsive to comparing each of the interaction metrics for each respective client device segment to the average interaction metrics, can insert a difference indication element onto the information resource. The difference indicator element may be positioned over, overlapping with, or adjacent to the respective content elements. The difference indicator may indicate whether the client device segment has interaction metrics different from the average interaction metrics by at least a predefined margin or margins.

The data processing system can determine whether the time elapsed since the request for interaction statistics is greater than or equal to a predefined time threshold (ACT 465). The data processing system can maintain a timer to determine whether time elapsed since receiving the request for interaction statistics is greater than or equal to a predefined time threshold. The timer can include an application, service, server, daemon, routine, or other executable logic for maintaining time. In some implementations, the data processing system can determine whether the time elapsed since transmitting the one or more interaction statistics is greater than or equal to the predefined time threshold. The data processing system can transmit the one or more interaction statistics to the content provider devices, the content publisher devices, the client devices, and the computing device associated with the request for interaction statistics, responsive to determining that the time elapsed is greater than or equal to the predefined time threshold. In some implementations, the data processing system can determine whether the time elapsed since transmitting the one or more interaction statistics is greater than or equal to the predefined time threshold.

If the time has elapsed since the request for interaction statistics is less than the predefined time threshold, the data processing system can monitor for changes in interaction metrics (ACT 470). The data processing system can maintain a comparator to determine whether the one or more interaction statistics have changed by at least a predefined metric threshold. The comparator can include an application, service, server, daemon, routine, or other executable logic for comparing the one or more interaction statistics. In some implementations, the data processing system can determine whether the one or more interaction statistics have changed by at least a predefined metric threshold, responsive to determining that the time elapsed since the request for interaction statistics or since transmitting the one or more interaction statistics is less than the predefined time threshold. In some implementations, the data processing system can retrieve the entries of the interaction log of the database for the information resource or the content element identified in the request for interaction statistics. In some implementations, the interaction metrics module can determine whether the one or more interaction statistics have changed by at least a predefined metric threshold per client device segment.

The data processing system can determine whether the change in interaction metrics is greater than or equal to a predefined metric threshold (ACT 475). If the change in interaction metrics is less than the predefined metric threshold, the data processing system can return to ACT 465. In some implementations, the data processing system can compare a length of the currently retrieved entries to a length of the previously retrieved entries. If the length of the currently retrieved entries is greater than the length of the previously retrieved entries by at least a predefined metric threshold length, the data processing system can recalculate the one or more interaction statistics based on the currently retrieved entries. In some implementations, the data processing system can transmit the recalculated one or more interaction statistics to the content provider devices, the content publisher devices, the client devices, and the computing device associated with the request for interaction statistics. In some implementations, the data processing system can compare the length of the currently retrieved entries to the length of the previously retrieved entries per client device segment.

In some implementations, the data processing system can calculate the one or more interaction statistics from the currently retrieved entries of the interaction log. In some implementations, the data processing system can compare the one or more interaction statistics calculated from the currently retrieved entries of the interaction log to the one or more interaction statistics calculated from the previously retrieved entries of the interaction log by at least a predefined metric threshold. In some implementations, the predefined metric threshold may differ from interaction type. In some implementations, if any of the one or more interaction statistics calculated from the currently retrieved entries of the interaction log is different from the corresponding one or more interaction statistics calculated from the previously retrieved entries of the interaction log by the predefined metric threshold, the data processing system can transmit the one or more interaction statistics calculated from the currently retrieved entries to the content provider devices, the content publisher devices, the client devices, and the computing device associated with the request for interaction statistics. In some implementations, the data processing system can calculate the one or more interaction statistics from the currently retrieved entries of the interaction log per client device segment.

In some implementations, the data processing system can determine the number of the one or more interaction statistics calculated from the currently retrieved entries different from the one or more interaction statistics calculated from the previously retrieved entries by the predefined metric threshold. If the number of the one or more interaction statistics calculated from the currently retrieved entries different from the one or more interaction statistics calculated from the previously retrieved entries by the predefined metric threshold, the data processing system can transmit the one or more interaction statistics calculated from the currently retrieved entries to the content provider devices, the content publisher devices, the client devices, and the computing device associated with the request for interaction statistics. In some implementations, the data processing system can determine the number of the one or more interaction statistics calculated from the currently retrieved entries different from the one or more interaction statistics calculated from the previously retrieved entries from the interaction log by the predefined metric threshold per client device segment.

If the time has elapsed since the request for interaction statistics is greater than the predefined time threshold or the change in interaction metrics is greater than the predefined metric threshold, the data processing system can transmit updated interaction metrics (ACT 480). The computing device can receive interaction metrics (ACT 485). The computing device can determine whether the interaction visualization script is executing (ACT 490). If the interaction visualization script is no longer executing, the computing device can end the process (ACT 495). If the interaction visualization script is still executing, the computing device can return ACT 435.

Figure 5:
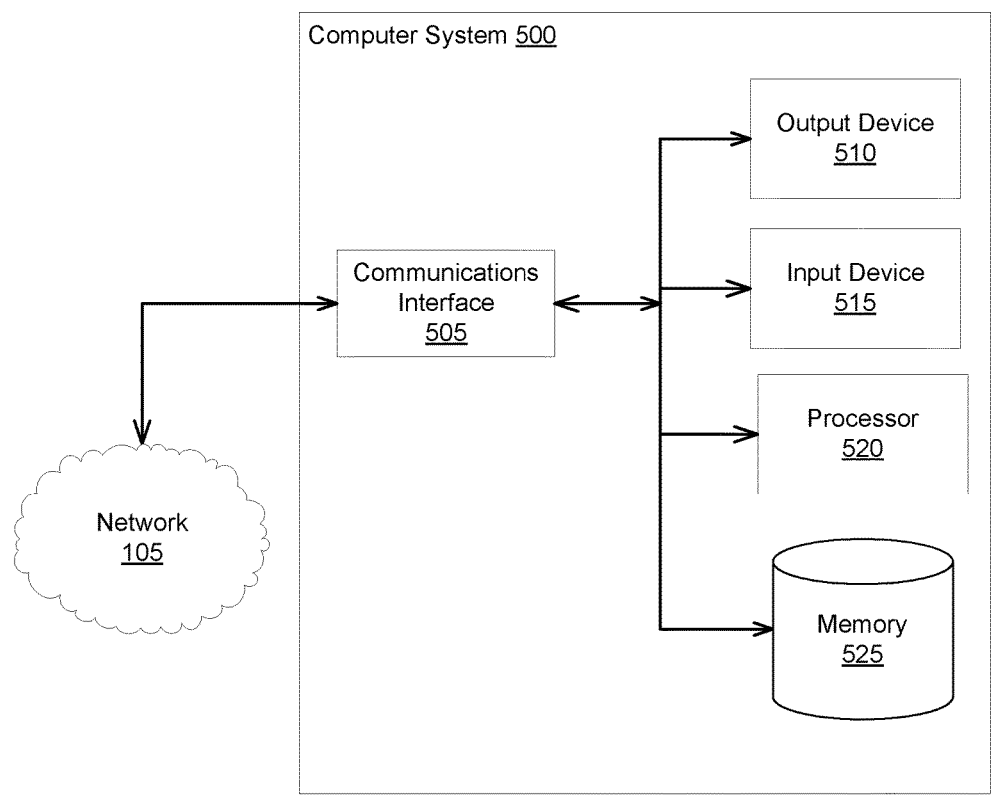
FIG. 5 is a block diagram illustrating a general architecture for a computer system that may be employed to implement elements of the systems and methods described and illustrated herein, according to an illustrative implementation.

FIG. 5 shows the general architecture of an illustrative computer system 500 that may be employed to implement any of the computer systems discussed herein (including the system 110 and its components such as the content delivery module 130, interaction recorder module 132, script provider module 136, and interaction metrics module 134 and the content administrator device 138 and its components such as the processor 202, I/O interface 206, network interface 206, memory 208, application 210, interaction statistics visualization script 220, element mapper module 222, element mapper module 222, resource modifier module 224, a visualization interface element 226, counter 228, comparator 230, timer 232, and rendering engine 214) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the content delivery module 130, interaction recorder module 132, script provider module 136, or the interaction metrics module 134. The processors 520 can be also included in the content administrator device 145 or the components of content administrator device 145 such as the element mapper module 222, resource modifier module 224, visualization interface element 226, counter 228, comparator 230, timer 232, application 210, resource request module 212, and rendering module 214, among others.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 525 to store information related to the interaction log 140, and the interaction statistics of the content elements on the information resource 216. The memory 525 can include the database 138. In referring to FIG. 2, the content provider administrator device 145 can be used to store information resource 216, content elements, instructions for the various submodules of the interaction statistics visualization script 220, interaction statistics storage 230, interaction metrics 232, and instructions for the application 210, among others. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 500. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 110. The communications interface 505 may be used as the network interface 204 of the content administrator device 145.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein. The input devices 510 and the output devices 515 may be used as the I/O interface 206 of the content administrator device 145.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content delivery module 130, interaction recorder module 132, script provider module 136, and interaction metrics module 134 can include or share one or more data processing apparatuses, computing devices, or processors. The interaction statistics visualization script 220, element mapper module 222, resource modifier module 224, visualization interface element 226, counter 228, comparator 230, timer, 228, application 210, resource request module 212, and rendering engine 214 can include or share one or more computing devices or processors (e.g., processor 202) of the content administrator device 145 (or client device 125A-N).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content delivery module 130, interaction recorder module 132, script provider module 136, and the interaction metrics module 134 can be part of the data processing system 110, a single module, a logic device having one or more processing modules, one or more servers, or part of a search engine. In addition, the application 205, interaction statistics visualization script 220, resource parser module 218, element mapper module 222, resource modifier module 224, counter 228, comparator 230, time 228, and rendering engine 214 can be part of a computing device (e.g., content administrator device 145), a single module, or a log device having one or more processing modules.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to providing interactive content for display, the systems and methods described herein can include applied to other environments in which data included in a log database used and compared to data corresponding to previous requests for content and responsive to determining a change in the data, identifying one or more content elements to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of dynamically rendering webpage interaction statistics data over graphical user interfaces, comprising:
   receiving, by a resource request module executing on a computing device having one or more processors, via a network interface, at a first time, from an interaction log system, an information resource including:
   a content element,
   a first interaction metric for the content element, the first interaction metric based on interaction data accumulated by the interaction log system from a plurality of client devices for the content element of the information resource, and
   a style specifier specifying a first visual style corresponding to a first range of interaction metrics and a second visual style corresponding to a second range of interaction metrics;
   determining, by an element mapper module executing on the computing device, that the first interaction metric of the content element is within the first range of interaction metrics;
   setting, by a resource modifier module executing on the computing device, the content element to the first visual style to indicate that the first interaction metric is determined to be within the first range of interaction metrics;
   displaying, by a rendering engine executing on the computing device, the information resource including the content element set to the first visual style;
   receiving, by the resource request module, while the information resource is loaded and displayed with the content element set to the first visual style at second time subsequent to the first time, from the interaction log system, a second interaction metric for the content element, the second interaction metric based on the interaction data accumulated by the interaction log system from the plurality of client devices for the content element of the information resource;
   determining, by the element mapper module, that the second interaction metric of the content element is within the second range of interaction metrics;
   modifying, by the resource modifier module, the content element of the information resource from the first visual style to the second visual style to indicate that the second interaction metric is determined to be within the second range of interaction metrics; and
   displaying, by the rendering engine, the information resource including the content element modified from the first visual style to the second visual style.

2. The method of claim 1, wherein receiving the information resource at the first time further comprises receiving the information resource including:
   a plurality of first interaction metrics, each of the first interaction metrics corresponding to a client device segment, each client device segment corresponding to a subset of the plurality of client devices; and
   an interface element including a plurality of actionable items corresponding to each of the plurality of client device segments, each of the plurality of actionable items configured to set the content element to the first visual style or the second visual style based on the corresponding first interaction metric of the plurality of interaction metrics;
   wherein receiving the second interaction metric at the second time further comprises receiving the plurality of second interaction metrics, each of the plurality of second interaction metrics corresponding to the client device segment; and further comprising:
   inserting, by the resource modifier module, the interface element into the information resource;
   wherein setting the content element to the first visual style further comprises setting the content element to the first visual style, responsive to detecting a first event on one of the plurality of actionable items on the interface element and determining that the corresponding first interaction metric of the plurality of first interaction metrics is within the first range of interaction metrics; and
   wherein modifying the content element to the second visual style further comprises modifying the content element to the second visual style, responsive to detecting a second event on one of the plurality of actionable items on the interface element and determining that the corresponding second interaction metric of the plurality of second interaction metrics is within the second range of interaction metrics.

3. The method of claim 1, wherein receiving the information resource including the first interaction metric further comprises receiving the information resource including:
the first interaction metric including a first type interaction metric and a second type interaction metric, each of the first type interaction metric and the second type interaction metric based on the interaction data accumulated by the interaction log system from the plurality of client devices for the content element of the information resource; and
an interface element including a first actionable item and a second interaction item, the first actionable item configured to set the content element to the first visual style or the second visual style based on the first type interaction metric, the second actionable item configured to set the content element to the first visual style or the second visual style based on the second type interaction metric; and further comprising:
monitoring, by the resource modifier module, for an event on the first actionable item; and
wherein determining that the first interaction metric is within the first range of interaction metrics further comprises determining that the first type interaction metric is within the first range of interaction metrics, responsive to detecting the event on the first actionable item; and
wherein setting the content element to the first visual style further comprises setting the content element to the first visual style based on determining that the first type interaction metric is within the first range of interaction metrics.

4. The method of claim 1, wherein receiving the information resource including the first interaction metric further comprises receiving the information resource including:
the first content element being actionable;
a second content element, the second content element having a default visual style and being non-actionable;
a third interaction metric for the second content element, the third interaction metric based on the interaction data accumulated by the interaction log system from a plurality of client devices for the second content element of the information resource;
the style specifier specifying the first visual style for the second content element corresponding to the first range of interaction metrics and the second visual style for the second content element corresponding to the second range of interaction metrics; and further comprising:
identifying, by the element mapper module, that the content element is actionable and that the second content element is non-actionable;
wherein setting the content element to the first visual style further comprises setting the content element to the first visual style, responsive to identifying that the content element is actionable; and further comprising:
maintaining, by the resource modifier module, the second content element to the default visual style, responsive to identifying that the second content element is non-actionable.

5. The method of claim 1, wherein receiving the information resource including the first interaction metric further comprises receiving an interface element including an actionable item configured to set the content element to the one of first visual style and the second visual style or a default visual style of the content element; and further comprising:
monitoring, by the resource modifier module, for an event on the actionable item of the interface element;
determining, by the element mapper module, that the content element is set to the first visual style or the second visual style, responsive to detecting the event on the interface element; and
setting, by the resource modifier module, the content element to the default visual style of the content element, responsive to determining that the content element is set to the first visual style or the second visual style.

6. The method of claim 1, further comprising:
comparing, by the element mapper module, the second interaction metric to the first interaction metric, responsive to receiving the second interaction metric;
wherein setting the content element to the second visual style further comprises inserting an interaction metric difference indicator on the content element based on determining that the second interaction metric differs from the first interaction metric by at least a predefined margin.

7. The method of claim 1, further comprising:
monitoring, by the resource modifier module, for an event on the content element; and
inserting, by the resource modifier module, responsive to detecting the event on the content element, a text element onto the information resource, the text element including the first interaction metric or the second interaction metric.

8. The method of claim 1, wherein receiving the second interaction metric further comprises receiving the second interaction metric from the interaction log system, responsive to the interaction log system determining that the interaction data has changed by at least a predefined metric threshold between the second time and the first time.

9. The method of claim 1, wherein receiving the second interaction metric further comprises receiving the second interaction metric from the interaction log system, responsive to the interaction log system determining that a predefined time threshold has lapsed between the first time and the second time.

10. A system for dynamically rendering webpage interaction statistics data over graphical user interfaces, comprising:
a resource request module executing on a computing device having one or more processors that:
receives, via a network interface, at a first time, from the interaction log system, an information resource including:
a content element,
a first interaction metric for the content element, the first interaction metric based on interaction data accumulated by the interaction log system from a plurality of client devices for the content element of the information resource, and
a style specifier specifying a first visual style corresponding to a first range of interaction metrics and a second visual style corresponding to a second range of interaction metrics;
an element mapper module executing on the computing device that:
determines that the first interaction metric is within the first range of interaction metrics;

a resource modifier module executing on the computing device that sets content element to the first visual style to indicate that the first interaction metric is determined to be within the first range of interaction metrics;

a rendering engine executing on the computing device that displays the information resource including the content element set to the first visual style;

wherein the resource request module receives, while the information resource is loaded and displayed with the content element set to the first visual style at second time subsequent to the first time, from the interaction log system, a second interaction metric for the content element, the second interaction metric based on the interaction data accumulated by the interaction log system from the plurality of client devices for the content element of the information resource;

wherein the element mapper module:
 determines that the second interaction metric of the content element is within the second range of interaction metrics; and wherein the resource modifier module modifies the content element of the information resource from the first visual style to the second visual style to indicate that the second interaction metric is determined to be within the second range of interaction metrics; and wherein the rendering engine displays the information resource including the content element modified from the first visual style to the second visual style.

11. The system of claim 10, wherein the resource request module:
 receives at the first time the information resource including:
  the first interaction metric including a plurality of first interaction metrics, each of the first interaction metrics corresponding to a client device segment, each client device segment corresponding to a subset of the plurality of client devices; and
  an interface element including a plurality of actionable items corresponding to each of the plurality of client device segments, each of the plurality of actionable items configured to set the content element to the first visual style or the second visual style based on the corresponding first interaction metric of the plurality of interaction metrics; and
 receives at the second time the information resource including:
  the second interaction metric including a plurality of second interaction metrics, each of the plurality of second interaction metrics corresponding to the client device segment;
 wherein the resource modifier module:
  inserts the interface element into the information resource;
  sets the content element to the first visual style, responsive to detecting a first event on one of the plurality of actionable items on the interface element and determining that the corresponding first interaction metric of the plurality of first interaction metrics is within the first range of interaction metrics; and
  modifies the content element to the second visual style, responsive to detecting a second event on one of the plurality of actionable items on the interface element and determining that the corresponding second interaction metric of the plurality of second interaction metrics is within the second range of interaction metrics.

12. The system of claim 10, wherein the resource request module receives the information resource including:
 the first interaction metric including a first type interaction metric and a second type interaction metric, each of the first type interaction metric and the second type interaction metric based on the interaction data accumulated by the interaction log system from the plurality of client devices for the content element of the information resource; and
 an interface element including a first actionable item and a second interaction item, the first actionable item configured to set the content element to the first visual style or the second visual style based on the first type interaction metric, the second actionable item configured to set the content element to the first visual style or the second visual style based on the second type interaction metric;
 wherein the resource modifier module monitors for an event on the first actionable item; and
 wherein the element mapper module determines that the first type interaction metric is within the first range of interaction metrics, responsive to detecting the event on the first actionable item; and
 wherein the resource modifier module sets the content element to the first visual style based on determining that the first type interaction metric is within the first range of interaction metrics.

13. The system of claim 10, wherein the resource request module receives the information resource including:
 the first content element being actionable;
 a second content element, the second content element having a default visual style and being non-actionable;
 a third interaction metric for the second content element, the third interaction metric based on the interaction data accumulated by the interaction log system from a plurality of client devices for the second content element of the information resource;
 the style specifier specifying the first visual style for the second content element corresponding to the first range of interaction metrics and the second visual style for the second content element corresponding to the second range of interaction metrics;
 wherein the element mapper module identifies that the content element is actionable and that the second content element is not actionable;
 wherein the resource modifier module:
  sets the content element to the first visual style, responsive to identifying that the content element is actionable; and
  maintains the second content element to the default visual style, responsive to identifying that the second content element is non-actionable.

14. The system of claim 10, wherein the resource request module:
 receives the information resource including an interface element including an actionable item configured to set the content element to the one of first visual style and the second visual style or a default visual style of the content element;
 wherein the resource modifier module monitors for an event on the actionable item of the interface element;
 wherein the element mapper module determines that the content element is set to be the first visual style or the second visual style, responsive to detecting the event on the interface element; and
 wherein the resource modifier module sets the content element to the default visual style of the content element, responsive to determining that the content element is set to the first visual style or the second visual style.

15. The system of claim 10, wherein the element mapper module compares the second interaction metric to the first interaction metric, responsive to receiving the second interaction metric; and
wherein the resource modifier module inserts an interaction metric difference indicator on the content element based on determining that the second interaction metric differs from the first interaction metric by at least a predefined margin.

16. The system of claim 10, wherein the resource modifier module:
monitors for an event on the content element; and
inserts responsive to detecting the event on the content element, a text element onto the information resource, the text element including the first interaction metric or the second interaction metric.

17. The system of claim 10, wherein the resource request module receives the second interaction metric from the interaction log system, responsive to the interaction log system determining that the interaction data has changed by at least a predefined metric threshold between the second time and the first time.

18. The system of claim 10, wherein the resource request module receives the second interaction metric from the interaction log system, responsive to the interaction log system determining that a predefined time threshold has lapsed between the first time and the second time.

19. The system of claim 10, wherein the resource modifier module
sets a color property of the content element to a first color tuple value different from a default color tuple value of the content element; and
sets the color property of the content element to a second color tuple value different from the first color tuple value and the default color tuple value of the content element.

20. A method of dynamically rendering webpage interaction statistics data over graphical user interfaces, comprising:
receiving, by a resource request module executing on a computing device having one or more processors, via a network interface, at a first time, from the interaction log system, a webpage including:
a content element,
a first interaction metric for the content element, the first interaction metric based on interaction data accumulated by the interaction log system from a plurality of client devices for the content element of the webpage, and
a style specifier specifying a first visual style corresponding to a first range of interaction metrics and a second visual style corresponding to a second range of interaction metrics;
determining, by an element mapper module executing on the computing device, that the first interaction metric is within the first range of interaction metrics;
setting, by a resource modifier module executing on the computing device, the content element to the first visual style to indicate that the first interaction metric is determined to be within the first range of interaction metrics;
displaying, by a rendering engine executing on the computing device, the webpage including the content element set to the first visual style;
receiving, by the resource request module, while the webpage is loaded and displayed with the content element set to the first visual style at second time subsequent to the first time, from the interaction log system, a second interaction metric for the content element, the second interaction metric based on the interaction data accumulated by the interaction log system from the plurality of client devices for the content element of the webpage;
determining, by the element mapper module, that the second interaction metric is within the second range of interaction metrics;
modifying, by the resource modifier module, the content element of the webpage from the first visual style to the second visual style to indicate that the second interaction metric is determined to be within the second range of interaction metrics; and
displaying, by the rendering engine, the webpage including the content element modified from the first visual style to the second visual style.

* * * * *